United States Patent
Sennami et al.

(10) Patent No.: US 7,737,658 B2
(45) Date of Patent: Jun. 15, 2010

(54) BATTERY PACKS HAVING A CHARGING MODE AND A DISCHARGING MODE

(75) Inventors: Hiromitsu Sennami, Fukushima (JP); Kazuhiko Takahashi, Fukushima (JP); Daiki Misawa, Fukushima (JP); Bunya Sato, Fukushima (JP); Takayuki Aita, Fukushima (JP)

(73) Assignee: Sony Corporation, Tokyo (JP)

( * ) Notice: Subject to any disclaimer, the term of this patent is extended or adjusted under 35 U.S.C. 154(b) by 497 days.

(21) Appl. No.: 10/972,118

(22) Filed: Oct. 22, 2004

(65) Prior Publication Data

US 2005/0162131 A1     Jul. 28, 2005

(30) Foreign Application Priority Data

Oct. 27, 2003  (JP) ............................ P2003-365854
Oct. 31, 2003  (JP) ............................ P2003-373052
Nov. 19, 2003  (JP) ............................ P2003-389277

(51) Int. Cl.
   *H02J 7/00* (2006.01)
(52) U.S. Cl. .................. 320/128; 320/111; 320/112; 320/130; 320/160
(58) Field of Classification Search ................ 320/111, 320/112, 113, 153, 118, 125, 140, 127, 128, 320/130, 160; 136/291, 293; 324/421, 433
   See application file for complete search history.

(56) References Cited

U.S. PATENT DOCUMENTS

| 5,160,879 | A | * | 11/1992 | Tortola et al. | 320/111 |
| 5,430,363 | A | * | 7/1995 | Kim | 320/128 |
| 5,563,493 | A | * | 10/1996 | Matsuda et al. | 320/124 |
| 5,739,667 | A | * | 4/1998 | Matsuda et al. | 320/128 |
| 5,818,201 | A | * | 10/1998 | Stockstad et al. | 320/119 |
| 5,914,869 | A | * | 6/1999 | Troiano | 363/61 |
| 6,118,254 | A | * | 9/2000 | Faulk | 320/141 |
| 6,127,801 | A | * | 10/2000 | Manor | 320/112 |
| 6,194,869 | B1 | * | 2/2001 | Peterzell | 320/134 |
| 6,342,798 | B1 | * | 1/2002 | Yoshida | 327/156 |
| 6,449,174 | B1 | * | 9/2002 | Elbanhawy | 363/65 |
| 7,391,183 | B2 | * | 6/2008 | Ariga et al. | 320/125 |
| 2003/0057914 | A1 | * | 3/2003 | Kamatsu et al. | 318/727 |
| 2003/0065426 | A1 | * | 4/2003 | Iino et al. | 700/300 |
| 2003/0122523 | A1 | * | 7/2003 | Kim et al. | 320/112 |

(Continued)

FOREIGN PATENT DOCUMENTS

JP          05-135804         6/1993

(Continued)

OTHER PUBLICATIONS

Japanese Office Action issued on Oct. 17, 2006.

*Primary Examiner*—Edward Tso
*Assistant Examiner*—Arun Williams
(74) *Attorney, Agent, or Firm*—Sonnenschein Nath & Rosenthal LLP

(57) ABSTRACT

A battery pack having a secondary battery is disclosed. The battery pack comprises at least one voltage converter; and switching means for switching an operation mode of the voltage converter to one of a charging mode and a discharging mode, in the charging mode, a charging voltage being output to the secondary battery, in the discharging mode, a voltage of the secondary battery being converted into a predetermined discharging voltage and the converted voltage being output.

20 Claims, 32 Drawing Sheets

U.S. PATENT DOCUMENTS

| | | | | |
|---|---|---|---|---|
| 2004/0052093 | A1* | 3/2004 | Kim | 363/21.01 |
| 2004/0101744 | A1* | 5/2004 | Suzuki | 429/61 |
| 2004/0194497 | A1* | 10/2004 | Sasaki et al. | 62/505 |
| 2004/0207362 | A1* | 10/2004 | Kanouda et al. | 320/104 |
| 2006/0033473 | A1* | 2/2006 | Stanzel et al. | 320/128 |

FOREIGN PATENT DOCUMENTS

| | | |
|---|---|---|
| JP | 08-308113 | 11/1996 |
| JP | 2000-278869 | 10/2000 |
| JP | 2003-217679 | 7/2003 |

* cited by examiner

BATTERY PACKS HAVING A CHARGING MODE AND A DISCHARGING MODE

RELATED APPLICATION DATA

The present application claims priority to Japanese Application(s) No(s). P2003-365 854 filed Oct. 27, 2003, P2003-373052 filed Oct. 31, 2003, and P2003-389277 filed Nov. 19, 2003, which application(s) is/are incorporated herein by reference to the extent permitted by law.

BACKGROUND OF THE INVENTION

1. Field of the Invention

The present invention relates to secondary battery packs such as lithium ion batteries and so forth.

2. Description of the Related Art

An electronic device that uses a battery pack requires several types of power supply voltages. Thus, the electronic device has a plurality of voltage converters. The voltage converters are for example DC-DC converters that raise and/or lower voltages and generate a plurality of desired voltages. Likewise, when a secondary battery pack is charged with electricity, an output voltage of a charger (AC adaptor) is raised and/or lowered by the DC-DC converters of the electronic device.

The following Patent Document 1 describes a battery pack that has a secondary battery and a voltage drop type converter and that outputs a constant voltage.

[Patent Document 1] Japanese Patent Laid-Open Publication No. HEI 7-7864

FIG. 4 shows the relation of a conventional battery pack and a main body of an electronic device (hereinafter simply referred to as electronic device). Reference numeral 1 represents a battery pack. Reference numeral 10 represents the electronic device. The electronic device 10 has a discharging circuit 11. The battery pack 1 has a secondary battery 2, a protecting circuit (IC circuit) 3, a discharging controlling FET 4, a charging controlling FET 5, and parasitic diodes 6 and 7 for the FETs 4 and 5.

The secondary battery 2 is for example a lithium ion battery, a lithium polymer battery, a nickel hydrogen battery, a nickel cadmium battery, a lithium metal battery, or the like. The lithium ion battery is formed in for example a box shape. The whole secondary battery 2 is housed by a steel battery case. The lithium polymer battery is sealed with an aluminum laminate film.

Since the lithium ion battery cannot stand an overcurrent and overdischarging, a battery cell and a protecting circuit are integrated into a battery pack. The protection circuit 3 have three protecting functions against overcharging, overdischarging, and overcurrent. Next, these protecting functions will be described in brief.

Next, the function of protection against overcharging will be described. When the lithium ion battery is charged with electricity, the battery voltage continuously rises even after the battery is fully charged. When the lithium ion battery is overcharged, it may become dangerous. Thus, the lithium ion battery should be charged with a constant current and a constant voltage so that the charging control voltage is equal to or lower than the rating of the battery (for example, 4.2 V). However, since the charger may become defective and a different type charger may be used, the lithium ion battery may be overcharged. Thus, when the lithium ion battery is overcharged and the battery voltage becomes a predetermined voltage or higher, the protecting circuit turns off the charging controlling FET 5 so as to shut out the charging current. This function is the protecting function against overcharging.

Next, the protecting function against overdischarging will be described. When the lithium ion battery is discharged below the rated discharge stop voltage and becomes an overdischarged state in which the battery voltage becomes for example 2 V to 1.5 V or below, the lithium ion battery may become defective. When the lithium ion battery is discharged and the battery voltage becomes a predetermined voltage or below, the protecting circuit turns off the discharging controlling FET 4 and shuts out the discharging current. This function is the protecting function against overdischarging.

Next, the protecting function against overcurrent will be described. When the plus terminal and the minus terminal of the lithium ion battery are short-circuited, there is a risk of which a large current flows in the battery and it is abnormally heated up. When the discharging current that flows exceeds a predetermined current value, the protecting circuit turns off the discharging controlling FET 4 and shuts out the discharging current. This function is the protecting function against overcurrent.

A discharging DC-DC converter 12 and a charging DC-DC converter 13 of the electronic device 10 are connected to external terminals of the foregoing battery pack 1. The discharging DC-DC converter 12 stabilizes the battery voltage that is input from the external terminals and supplies the stabilized voltage to the discharging circuit 11 through a discharging terminal 14 and a ground terminal 15.

A charging voltage is supplied from a charger 17 to the charging DC-DC converter 13 through a charging terminal 16 and the ground terminal 15. The charging DC-DC converter 13 converts the charging voltage supplied from the charger 17 into a rated charging voltage and supplies the rated charging voltage to the secondary battery 2 of the battery pack 1 through the external terminals.

FIG. 5 shows another example of the structure of a conventional battery pack and an electronic device 10. The structure shown in FIG. 5 is the same as the structure of the battery pack shown in FIG. 4 except that a battery pack 1 contains a charging DC-DC converter 12.

FIG. 6 shows another example of the structure of a conventional battery pack and an electronic device 10. The structure shown in FIG. 6 is the same as the structure shown in FIG. 4 except that a battery pack 1 contains a discharging DC-DC converter 13.

As described above, since the conventional secondary battery pack needs two DC-DC converters, which are the charging DC-DC converter 12 and the discharging DC-DC converter 13. Thus, the conventional secondary battery pack is adversely expensive and needs the space for them. In addition, since the electronic device has the DC-DC converter, there is a risk of which the DC-DC converter generates noise. Thus, it was necessary to consider a circuit against the noise.

OBJECTS AND SUMMARY OF THE INVENTION

Therefore, an object of the present invention is to provide a battery pack that has one voltage converter in common with a charging voltage converter and a discharging voltage converter and that allows an electronic device not to have a voltage converting circuit such as a DC-DC converter so as to reduce cost and space and suppress the influence of radiating noise generated from the voltage converting circuit.

A first aspect of the present invention is a battery pack having a secondary battery, the battery pack comprising: at least one voltage converter; and switching means for switching an operation mode of the voltage converter to one of a charging mode and a discharging mode, in the charging mode, a charging voltage being output to the secondary battery, in the discharging mode, a voltage of the secondary battery being converted into a predetermined discharging voltage and the converted voltage being output.

A second aspect of the present invention is a battery pack having a secondary battery, the battery pack comprising: at least one voltage converter; a plurality of output terminals for at least two different voltages; and power controlling means for determining whether or not the secondary battery is normally operating and turning on and off the power of the voltage converter in accordance with the determined result.

A third aspect of the present invention is a battery pack having a secondary battery, the battery pack comprising: at least one voltage converter; a plurality of output terminals for at least two different voltages; and power controlling means for determining whether or not the voltage converter is normally operating and turning on and off the power of the voltage converter in accordance with the determined result.

A fourth aspect of the present invention is a battery pack having a secondary battery, the battery pack comprising: at least one voltage converter; a plurality of output terminals for at least two different voltages; an input terminal for a start signal that represents whether or not an output of the voltage converter is required; and power controlling means for turning on/off the power of the voltage converter in accordance with the start signal.

According to the present invention, one voltage converter has a function for a charging voltage converter and a function for a discharging voltage converter and switching means switches one function to the function. Thus, the cost of the battery pack can be reduced in accordance with the structure having both the charging voltage converter and the discharging voltage converter. In addition, an electronic device does not need a voltage converter. Moreover, the electronic device or the battery pack does not need the space for the voltage converter.

When a DC-DC converter is used as a voltage converter, if it is switched at a high frequency ranging from 10 kHz to 2 MHz, radiating noise takes place. According to the present invention, when the battery pack has a DC-DC converter as a voltage converter, the distance between the internal circuit of the electronic device and the DC-DC converter becomes large. Thus, the influence of noise of the DC-DC converter against the internal circuit of the electronic device can be suppressed. In addition, since the battery pack has a voltage converter, a steel battery case of a box shaped battery or an aluminum laminate film of a lithium polymer battery can reduce noise of radio frequency electromagnetic waves.

According to the present invention, the secondary battery can be charged with electricity without need to use an AC adaptor and a cradle. In addition, since the AC plug is used in common with a charging input terminal and a discharging output terminal, the number of external terminals can be decreased. In addition, since the battery pack has a discharging voltage converter, the electronic device does not need a discharging voltage converter. As a result, the circuit structure of the electronic device can be simplified. When a DC-DC converter is used and a switching control is preformed at a high frequency of 10 kHz to 2 MHz, radiating noise takes place. When the battery pack has a DC-DC converter as a voltage converter, the distance between the internal circuit of the electronic device and the DC-DC converter can be increased. As a result, the influence of noise against the internal circuit of the electronic device can be suppressed. When the battery pack has a voltage converter, a steel battery case of a box shaped battery or an aluminum laminate film of a lithium polymer battery can suppress noise of high frequency electromagnetic waves.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawing, wherein similar reference numerals denote similar portions, in which.

DETAILED DESCRIPTION OF THE PREFERRED EMBODIMENTS

Next, with reference to the accompanying drawings, embodiments of the present invention will be described.

First Embodiment

Figure 1:
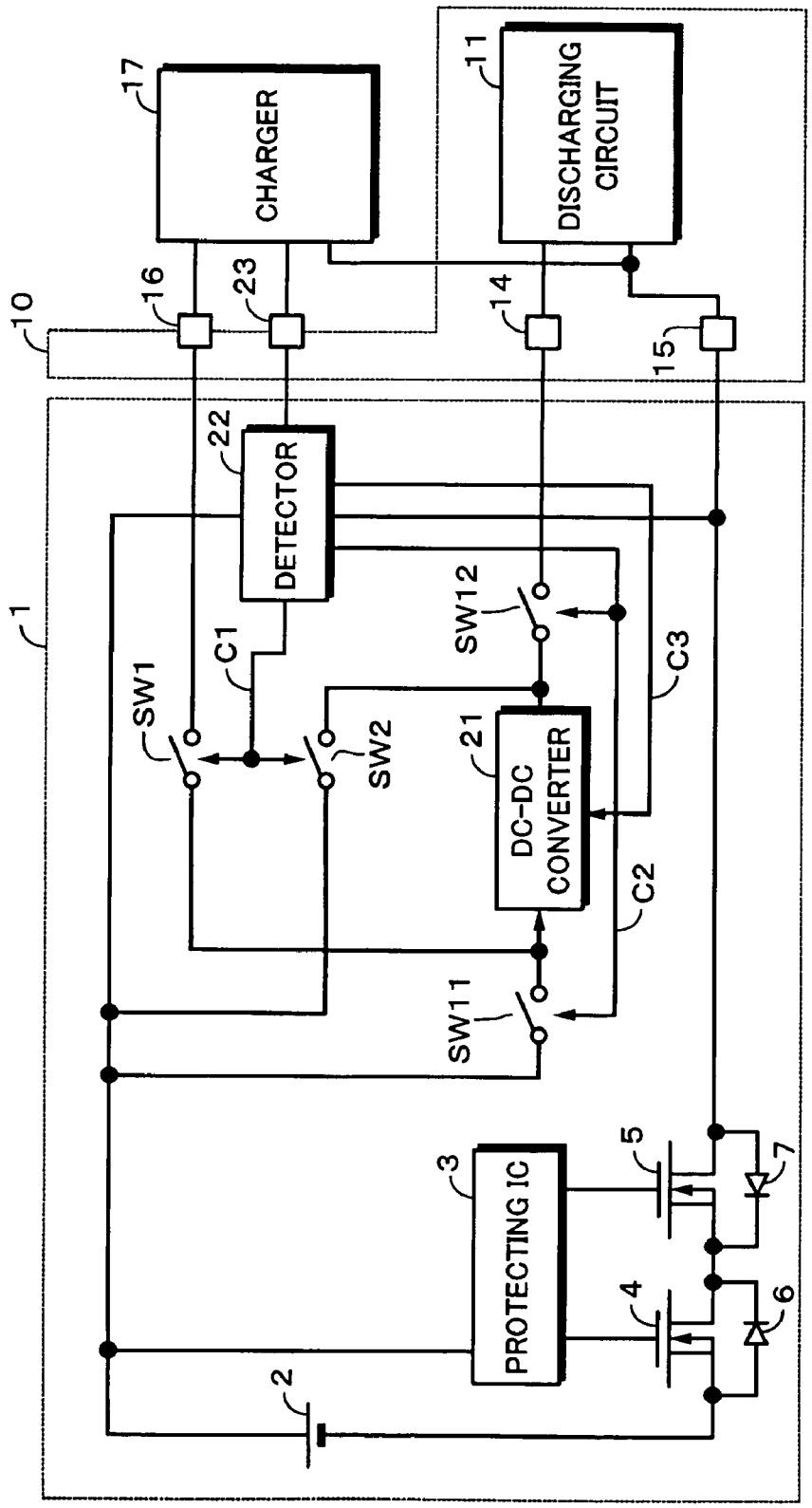
FIG. 1 is a schematic diagram showing the structure of a battery pack according to a first embodiment of the present invention.

FIG. 1 shows the structure of a battery pack according to a first embodiment of the present invention. In FIG. 1, similar portions to those described above are denoted by similar reference numerals. In other words, a battery pack 1 has a secondary battery 2 and a protecting circuit 3. A discharging controlling FET 4 and a charging controlling FET 5 are controlled in accordance with an output of the protecting circuit 3. An electronic device 10 has a discharging circuit 11 that needs a DC power supply.

The discharging circuit 11 is connected to a discharging output terminal 14 and a ground terminal 15. An external charger 17 inputs an AC voltage of 100 V as a home use power supply (commercial power supply) and supplies a charging voltage of for example 5 V to a charging terminal 16 and the ground terminal 15.

Reference numeral 21 represents a DC-DC converter. Besides the DC-DC converter 21, other DC-DC converters may be disposed so as to obtain a plurality of discharging output voltages. Along with the secondary battery 2 and the protecting circuit 3, the DC-DC converter 21 is housed in a relatively hard case made of a material such as plastic. In reality, the DC-DC converter 21, the protecting circuit 3, and so forth are mounted on a substrate. The secondary battery 2 is disposed adjacent to the substrate. Alternatively, along with a power generating device, the DC-DC converter 21 may be disposed in the case of the secondary battery 2.

The DC-DC converter 21 is a circuit that generates a stabilized output voltage that is different from an input voltage (battery voltage). The DC-DC converter 21 may be one of various types for example a charge pump type using a capacitor and a switching device, a step-up converter (step-down converter) using a diode, an inductor, a capacitor, and a switching device, or a switching regulator using a transformer and a switching device. Alternatively, the DC-DC converter 21 may be a piezoelectric inverter using a piezoelectric transformer or a series regulator using a bipolar transistor device. As a charge pump type DC-DC converter or a switching regulator, devices having a size of around 4 mm×4 mm have been developed. Thus, along with the protecting circuit 3, the DC-DC converter 21 can be easily disposed in the battery pack.

An input terminal of the DC-DC converter 21 is connected to the charging terminal 16 through a switch SW1. An output terminal of the DC-DC converter 21 is connected to a plus electrode of the secondary battery 2 through a switch SW2. In addition, the input terminal of the DC-DC converter 21 is connected to the plus electrode of the secondary battery 2 through a switch SW11. The output terminal of the DC-DC converter 21 is connected to the discharging output terminal 14 through a switch SW12. In reality, the switches SW1, SW2, SW11, and SW12 are semiconductor switches, relay contacts, or the like.

Reference numeral 22 represents a detector. The detector 22 generates a control signal C1 with which the switches SW1 and SW2 are controlled; a control signal C2 with which the switches SW11 and SW12 are controlled; and a control signal C3 with which an output voltage of the DC-DC converter 21 is switched. The detector 22 is connected to an ID resistance recognition terminal 23 with which the value of an identification resistance (hereinafter referred to as ID resistance) of the charger 17 can be read. The ID resistance identifies the type of the charger in accordance with the resistance value. The detector 22 can determine whether or not the charger 17 connected to the battery pack 1 is proper in accordance with the value of the ID resistance that the detector 22 has read. The detector 22 is an electronic circuit or a microcomputer.

When a proper charger 17 has not been connected to the battery pack 1, the charger 22 determines that the battery pack 1 should operate in a discharging mode. In the discharging mode, the control signals C1, C2, and C3 cause the switches SW1 and SW2 to be turned off and the switches SW11 and SW12 to be turned on. As a result, the output voltage of the DC-DC converter 21 becomes the discharging output voltage. In the discharging mode, a voltage of for example 3 V into which a battery voltage of 2.5 V to 4.2 V has been converted by the DC-DC converter 21 is supplied to the discharging circuit 11 connected to the terminals 14 and 15.

When the detector 22 has detected a proper charger 17 in accordance with the ID resistance, the charger determines that the battery pack 1 should operate in a charging mode. In the charging mode, the control signals C1, C2, and C3 cause the switches SW1 and SW2 to be turned on and the switches SW11 and SW12 to be turned off. As a result, the output voltage of the DC-DC converter 21 becomes the preset rated charging voltage. In the charging mode, the secondary battery 2 is charged with a charging voltage of for example 4.2 V into which a charging voltage of for example 6 V has been converted by the DC-DC converter 21.

Second Embodiment

Figure 2:
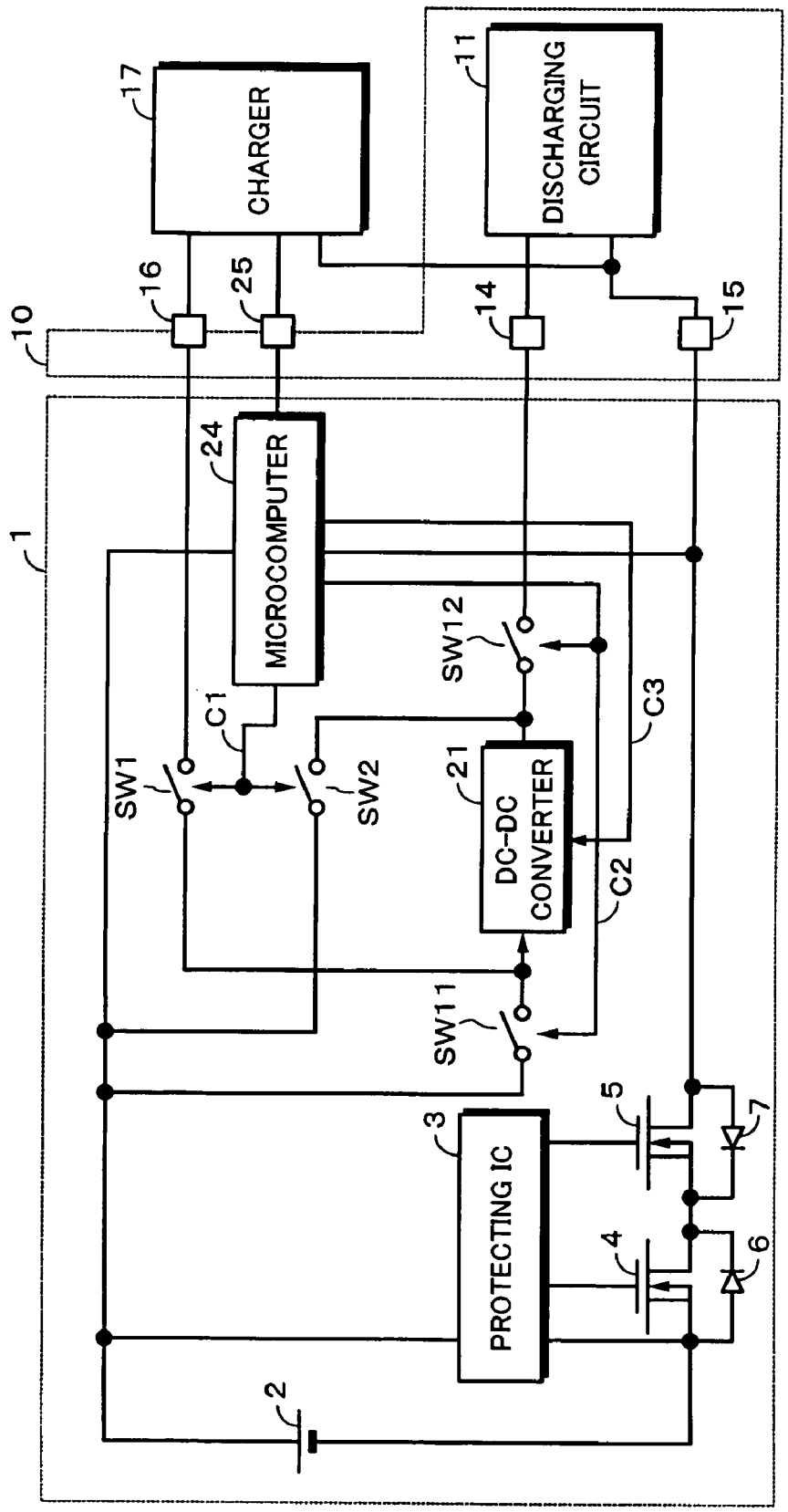
FIG. 2 is a schematic diagram showing the structure of a battery pack according to a second embodiment of the present invention.

FIG. 2 shows the structure of a battery pack according to a second embodiment of the present invention. According to the second embodiment, a microcomputer denoted by reference numeral 24 is disposed. The microcomputer 24 generates control signals C1, C2, and C3.

The microcomputer 24 performs a digital communication with a charger 17 through a communication terminal 25. As a digital communication system, a conventional duplex communication can be used. With the digital communication, the microcomputer 24 determines whether or not a proper charger 17 has been connected to a battery pack 1.

When a proper charger 17 has not been connected to the battery pack 1, the microcomputer 24 determines that the battery pack 1 should operate in a discharging mode. In other words, the control signals C1, C2, and C3 cause switches SW1 and SW2 to be turned off and switches SW11 and SW12 to be turned on. As a result, an output voltage of the DC-DC converter 21 becomes a preset discharging output voltage.

When the microcomputer 24 has determined that a proper charger 17 has been connected to the battery pack 1 through the digital communication, the microcomputer 24 determines that the battery pack 1 should operate in a charging mode. In the charging mode, the control signals C1, C2, and C3 cause the switches SW1 and SW2 to be turned on and the switches SW11 and SW12 to be turned off. As a result, the output voltage of the DC-DC converter 21 becomes the preset rated charging voltage.

Third Embodiment

Figure 3:
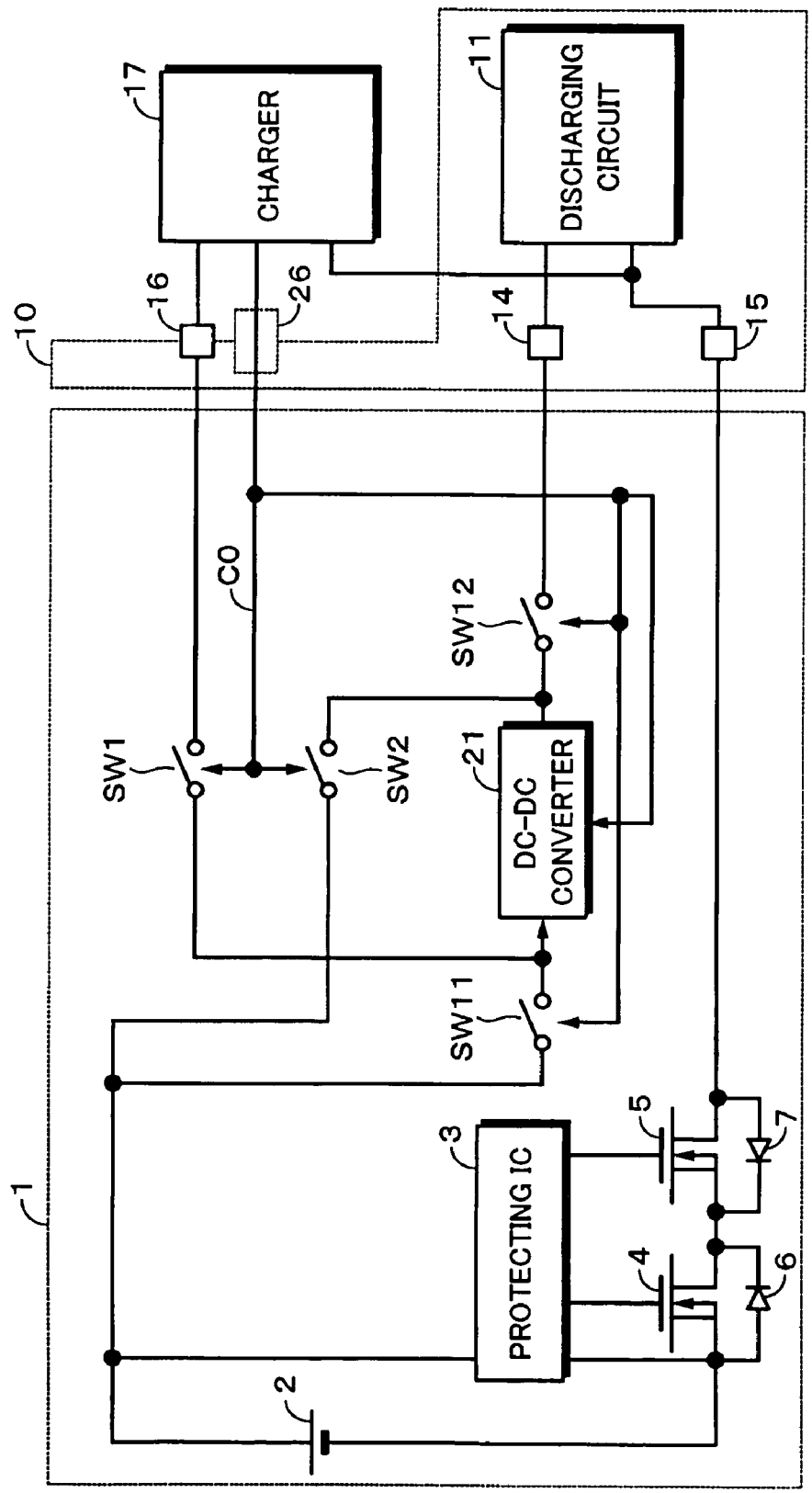
FIG. 3 is a schematic diagram showing the structure of a battery pack according to a third embodiment of the present invention.
Figure 4:
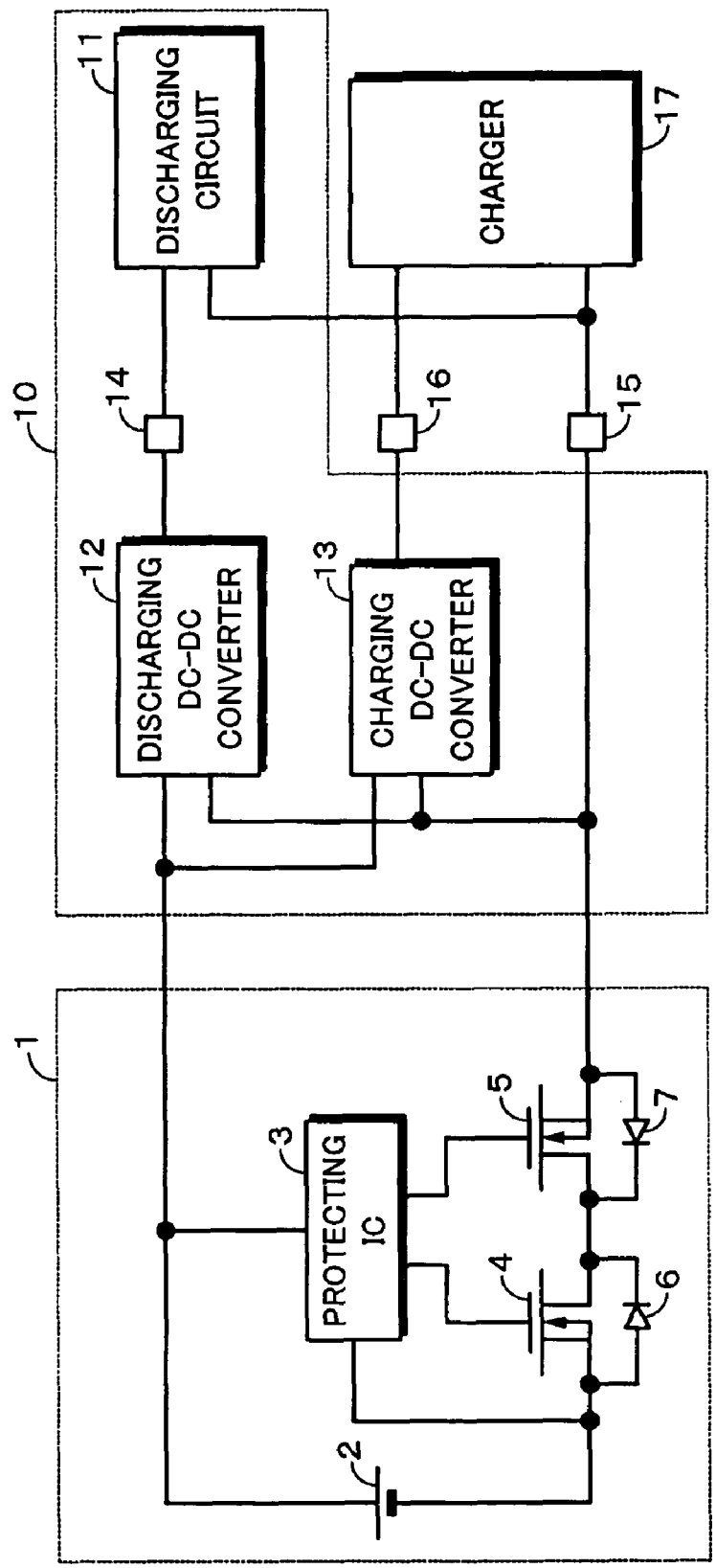
FIG. 4 is a schematic diagram showing an example of the connections of a conventional battery pack.
Figure 5:
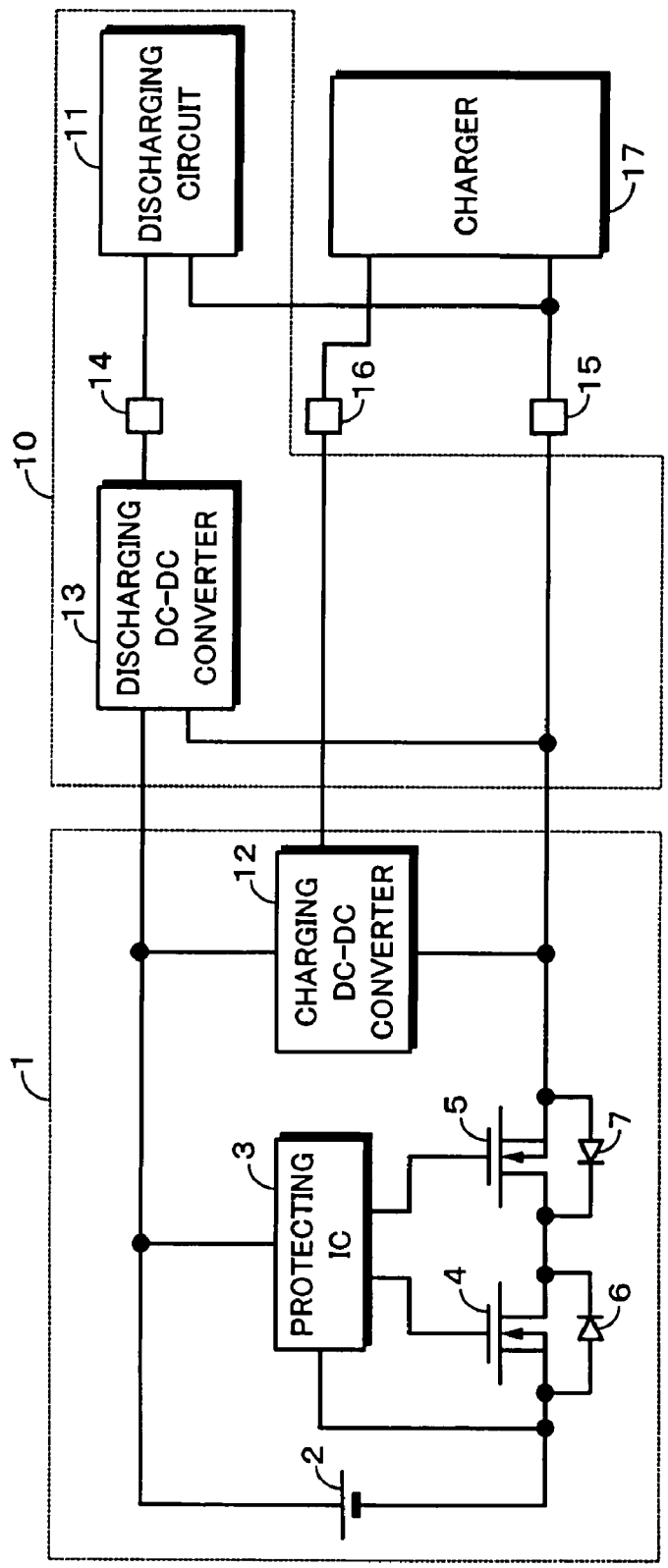
FIG. 5 is a schematic diagram showing another example of the connections of a conventional battery pack.
Figure 6:
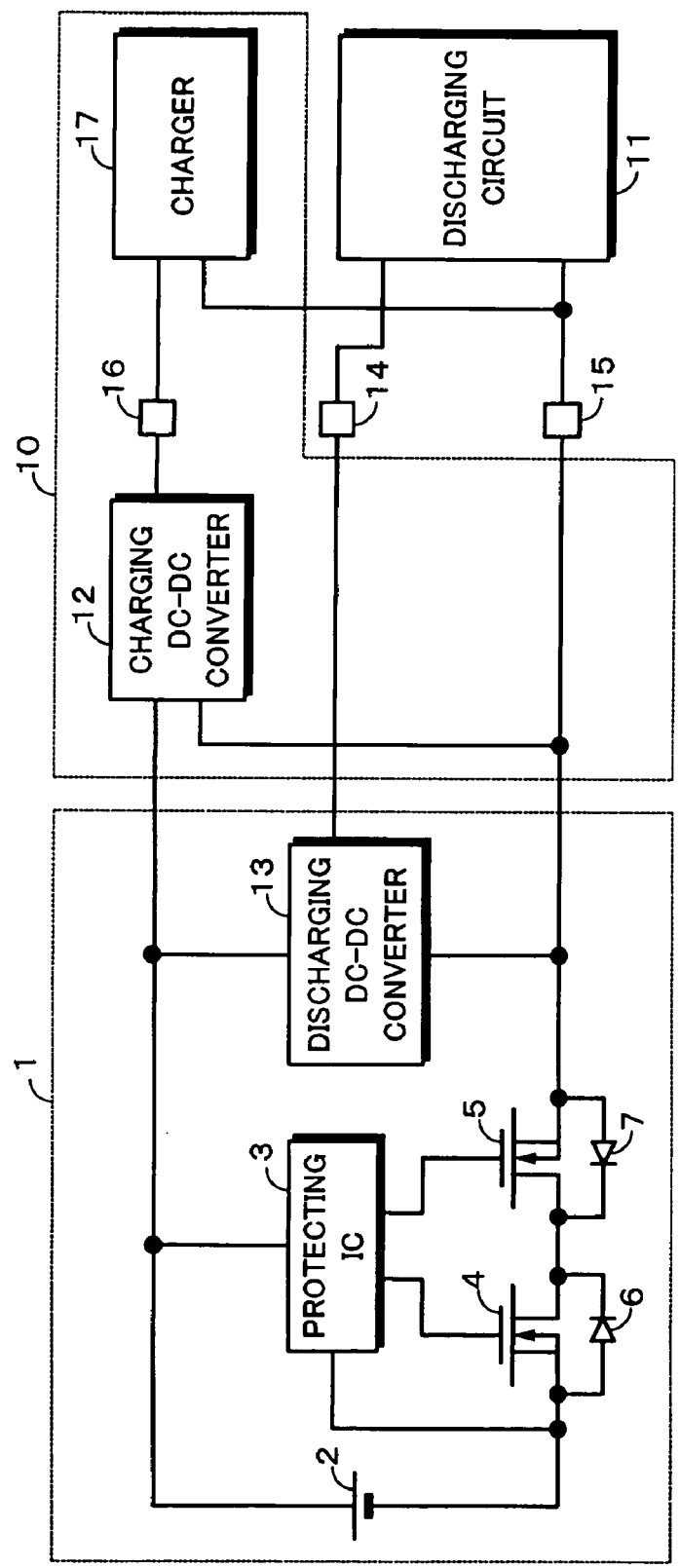
FIG. 6 is a schematic diagram showing another example of the connections of a conventional battery pack.

FIG. 3 shows the structure of a battery pack according to a third embodiment of the present invention. A battery pack according to the third embodiment is denoted by reference numeral 1 and has a mechanical switch 26. When a charger 17 is connected to an electronic device 10, the switch 26 is mechanically turned on (or off). The switch 26 generates a control signal C0.

When the charger 17 has not been connected, for example the switch 26 is tuned off and the control signal C0 becomes for example "0" (that represents logical "0"). As a result, the battery pack 1 operates in the discharging mode. In other words, the control signal causes switches SW1 and SW2 to be turned off and switches SW11 and SW12 to be turned on. The output voltage of the DC-DC converter 21 becomes the preset discharging output voltage.

When the charger 17 is connected to the battery pack 1, the switch 26 is turned on and the control signal C0 becomes "1" (that presents logical "1"). As a result, the battery pack 1 operates in the charging mode. The control signal C0 causes the switches SW1 and SW2 to be turned on and the switches SW11 and SW12 to be turned off. As a result, the output voltage of the DC-DC converter 21 becomes the preset rated charging voltage.

According to the present invention, the battery pack may not have a protecting circuit. In addition, according to the foregoing embodiments, four switches are used. However, when the input side switches SW1 and SW11 are substituted with a switch that has two input terminals and one output terminal and the output side switches SW2 and SW12 are substituted with a switch that has one input terminal and two output terminals, a structure using two switches can be accomplished. In addition, when the output voltage in the charging mode is the same as the output voltage in the discharging mode, it is not necessary to supply to the DC-DC converter 21 a control signal that causes an output voltage to be switched.

Alternatively, the charger may be directly connected to the battery pack, not the electronic device. In addition, a bidirectional type DC-DC converter may be used.

Figure 7:
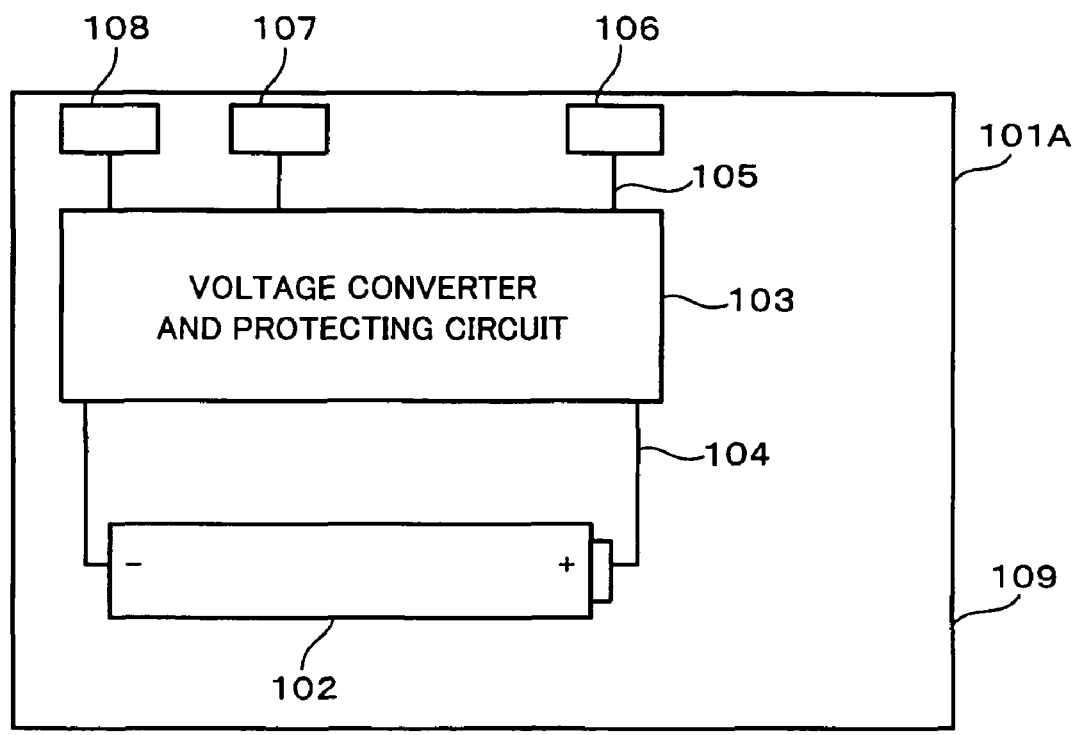
FIG. 7 is a schematic diagram showing the structure of a first example of a battery pack according to the present invention.

Next, with reference to FIG. 7, a first example of a battery pack according to the present invention will be described. In FIG. 7, reference numeral 101A represents a whole battery pack. Reference numeral 102 represents a secondary battery. Reference numeral 103 represents a voltage converter and protecting circuit. The voltage converter and protecting circuit 103 is connected to the secondary battery 102 through electric wiring 104.

The secondary battery 102 is for example a lithium ion battery, a lithium polymer battery, a nickel hydrogen battery, a nickel cadmium battery, a lithium metal battery, or the like. The lithium ion battery is formed in for example a box shape. The whole secondary battery 102 is housed in a steel battery case. The lithium polymer battery is sealed with an aluminum laminate film. The secondary battery may be a new type secondary battery that will be developed in future.

The battery pack 101A has external terminals 106, 107, and 108 that are connected to the voltage converter and protecting circuit 103 through electric wiring 105. The secondary battery 102 and the voltage converter and protecting circuit 103 are housed in a relatively hard case 109 made of a material such as plastic.

Figure 8:
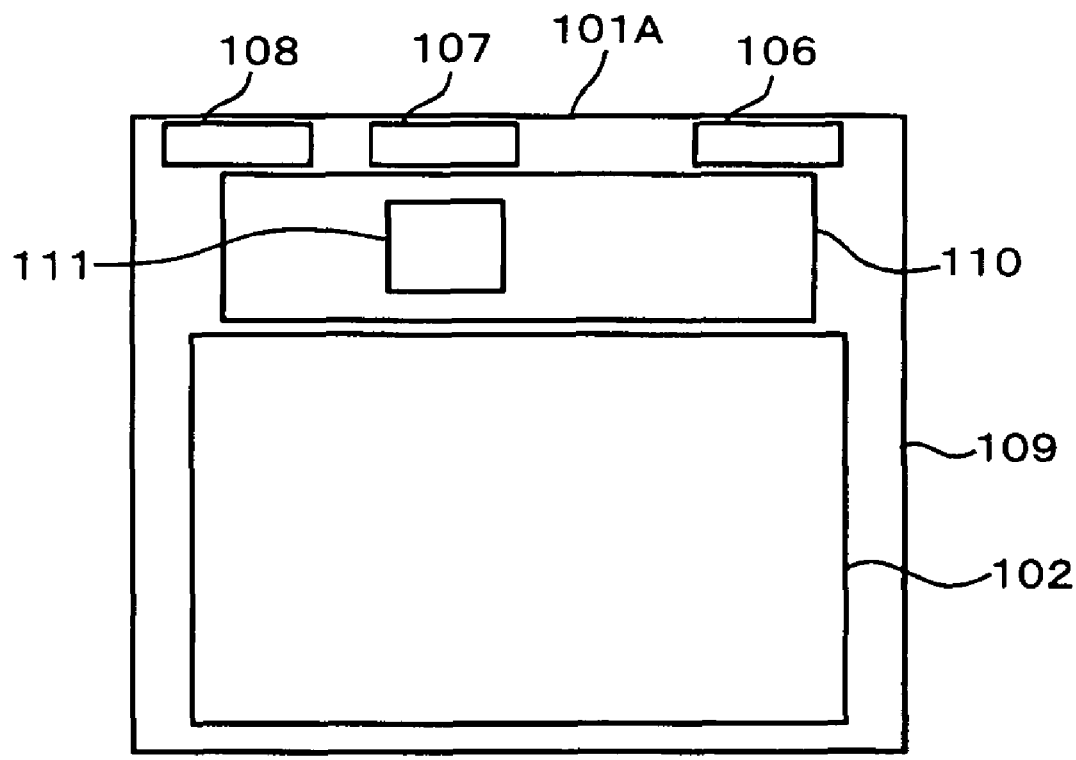
FIG. 8 is a schematic diagram showing the internal structure of the first example of the battery pack.

FIG. 8 shows the layout of the battery pack 101A according to the present invention. The voltage converter and protecting circuit 103 has a voltage converter 111. The voltage converter 111 is mounted on a substrate 110. The voltage converter and protecting circuit 103 is disposed on the opposite side of the substrate 110. Adjacent to the substrate 110 is disposed the secondary battery 102. Besides the structure shown in FIG. 8, the voltage converter 111 may be disposed in the secondary battery 102.

The voltage converter 111 is a circuit that generates a stabilized output voltage that is different from an input voltage (battery voltage). The voltage converter 111 may be one of various types for example a charge pump type using a capacitor and a switching device, a step-up converter (step-down converter) using a diode, an inductor, a capacitor, and a switching device, or a switching regulator using a transformer and a switching device. Alternatively, the voltage converter 111 may be a piezoelectric inverter using a piezoelectric transformer or a series regulator using a bipolar transistor device. As a charge pump type voltage converter or a switching regulator, devices having a size of around 4 mm×4 mm have been developed. Thus, along with a protecting circuit, the voltage converter 111 can be easily disposed in the battery pack 101A.

Fourth Embodiment

Figure 9:
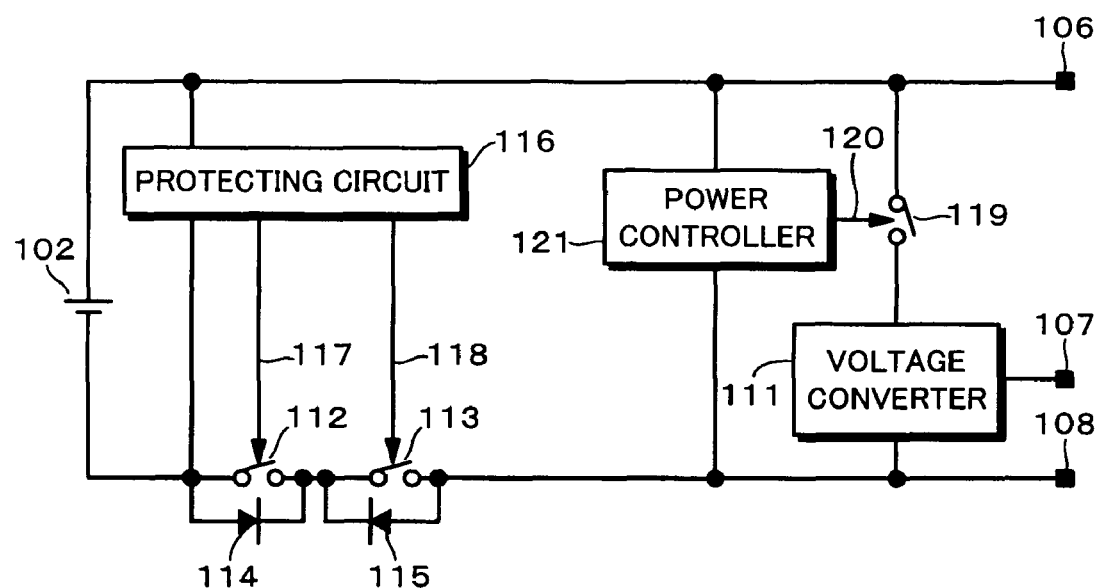
FIG. 9 is a schematic diagram showing the structure of a battery pack according to a fourth embodiment of the present invention.

FIG. 9 shows the structure of a battery pack according to a fourth embodiment of the present invention. A plus electrode of a secondary battery 102 and an external terminal 106 are connected. A minus electrode of the secondary battery 102 and an external terminal 108 are connected through a discharging current switch 112 and a charging current switch 113. A battery voltage of the secondary battery 102 is directly output between the external terminals 106 and 108. The normal battery voltage of the secondary battery 102 is set to for example 2.5 V to 4.3 V.

Switches 112 and 113 are composed of for example N channel type FETs. Parasitic diodes 114 and 115 are connected in parallel with the switches 112 and 113, respectively. The switches 112 and 113 are controlled in accordance with a discharging control signal 117 and a charging control signal 118 supplied from a protecting circuit 116.

The protecting circuit 116 has a conventional circuit structure. The protecting circuit 116 controls the switches 112 and 113 so as to protect the battery pack 101A against overcharging, overdischarging, and overcurrent. When the battery voltage is in the preset voltage range (normal state), both the discharging control signal 117 and the charging control signal 118 are "1" (that represents a logical level) that cause the switches 112 and 113 to be turned on. Thus, the secondary battery 102 can freely discharge electricity to the load. In addition, the charger can freely charge the secondary battery 102 with electricity.

When the battery voltage is lower than the preset voltage range, the discharging control signal 117 becomes "0" (that represents a logical level) that causes the switch 112 to be turned off. As a result, the discharging current is prohibited from flowing. Thereafter, when the charger is connected to the battery pack 101A, it is charged with electricity through the diode 114.

When the battery voltage is higher than the preset voltage range, the charging control signal 118 becomes "0" that causes the switch 113 to be turned off. As a result, the battery pack 101A is prohibited from being charged. The battery pack 101A discharges electricity to the load through the diode 115.

When the external terminals 106 and 108 are short-circuited, an overdischarging current flows in the battery pack 101A. As a result, the FETs may become defective. Thus, when the discharging current becomes a predetermined current, the discharging control signal 117 becomes "0" that causes the switch 112 to be turned off. As a result, the discharging current is prohibited from flowing from the battery pack 101A.

One power terminal of the voltage converter 111 is connected to the plus electrode of the secondary battery 102 through a voltage converter power switch 119. The other power terminal of the voltage converter 111 is connected to the minus electrode through the switches 112 and 113. An output terminal of the voltage converter 111 is connected to an external terminal 107. The voltage converter 111 converts the battery voltage into a constant voltage that is different from the battery voltage. The constant voltage is extracted from the external terminals 107 and 108. In reality, the power switch 119 is a semiconductor switch, a relay contact, or the like.

The battery pack 101A also has a power supply controller 121 that generates a power control signal 120 with which the voltage converter power switch 119 is controlled. When the battery voltage between the external terminals 106 and 108 is in the preset voltage range (2.5 V to 4.3 V) (normal state), the power supply controller 121 turns on the power switch 119. When the battery voltage is out of the preset voltage range (2.49 V or lower or 4.3 V or higher), the power supply controller 121 turns off the power switch 119. With the power switch 119, when the residual discharging capacity of the battery is low, the current consumption of the voltage converter 111 can be decreased. Thus, when the residual discharging capacity of the battery is low, the discharging of the battery can be suppressed.

Fifth Embodiment

Figure 10:
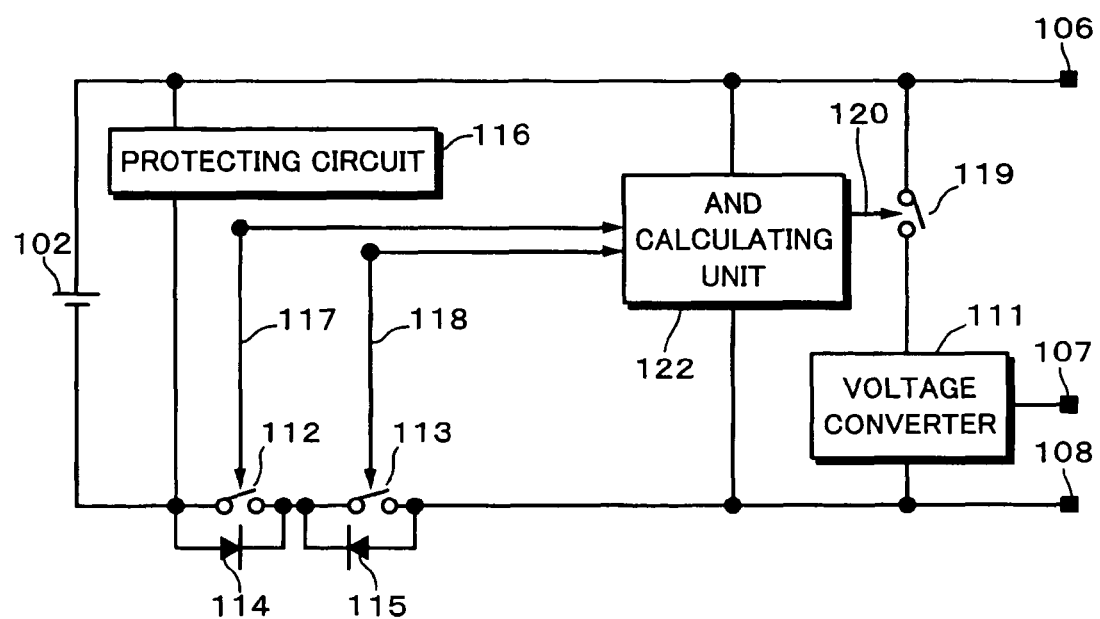
FIG. 10 is a schematic diagram showing the structure of a battery pack according to a fifth embodiment of the present invention.

FIG. 10 shows the structure of a battery pack according to a sixth embodiment of the present invention. In FIG. 10, similar portions to those in FIG. 9 are denoted by similar reference numerals. Reference numeral 122 represents an AND calculating unit (for example, an AND gate). The AND calculating unit 122 generates a power control signal 120 with which a voltage converter power switch 119 is controlled.

A discharging control signal 117 and a charging control signal 118 are supplied from a protecting circuit 116 to the AND calculating unit 122. As described above, when the battery pack 101A is normally operating, these control signals 117 and 118 are "1" that cause switches 112 and 113 to be turned on. When a protection function operates, one of the control signals 117 and 118 becomes "0." Thus, when both the discharging control signal 117 and the charging control signal 118 are "1," the AND calculating unit 122 generates a power control signal 120 that causes a power switch 119 to be turned on.

According to the fifth embodiment, when the residual discharging capacity of the battery is low, the battery pack can suppress discharging. In addition, the voltage converter 111 can be prevented from becoming defective against overvoltage. In such a manner, according to the fourth and fifth embodiments, when the secondary battery is normally operating, the battery pack turns on the power of the voltage converter 111 so as to cause the voltage converter 111 to operate.

Alternatively, the discharging current switch 112 and the charging current switch 113 may be connected to the plus electrode side of the secondary battery 102. In this case, P channel type FETs are used. When the secondary battery 102 is normally operating, both the discharging control signal 117 and the charging control signal 118 are "0." When a protection function operates, one of these signals becomes "1." Thus, only when both the discharging control signal 117 and the charging control signal 118 are "0," a NOR gate generates a control signal that causes the voltage converter power switch to be turned on. With the voltage converter power switch 119, when the residual discharging capacity of the battery is low, the current consumption of the voltage converter can be decreased.

Figure 11:
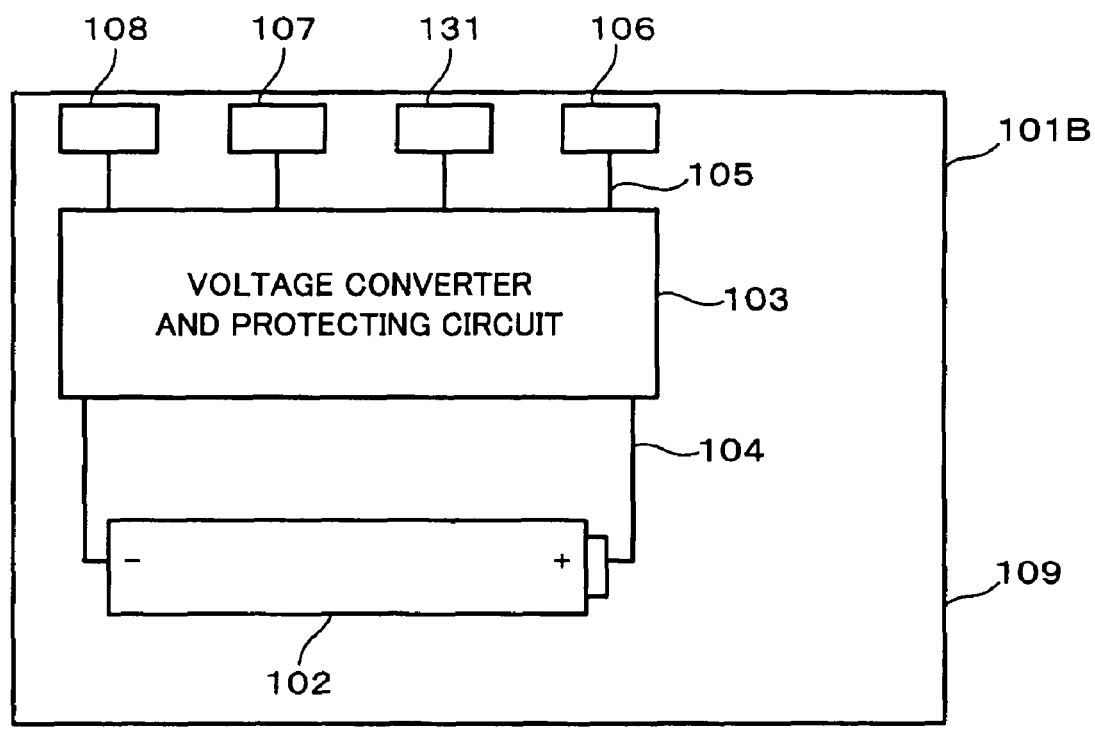
FIG. 11 is a schematic diagram showing the structure of a second example of a battery pack according to the present invention.
Figure 12:
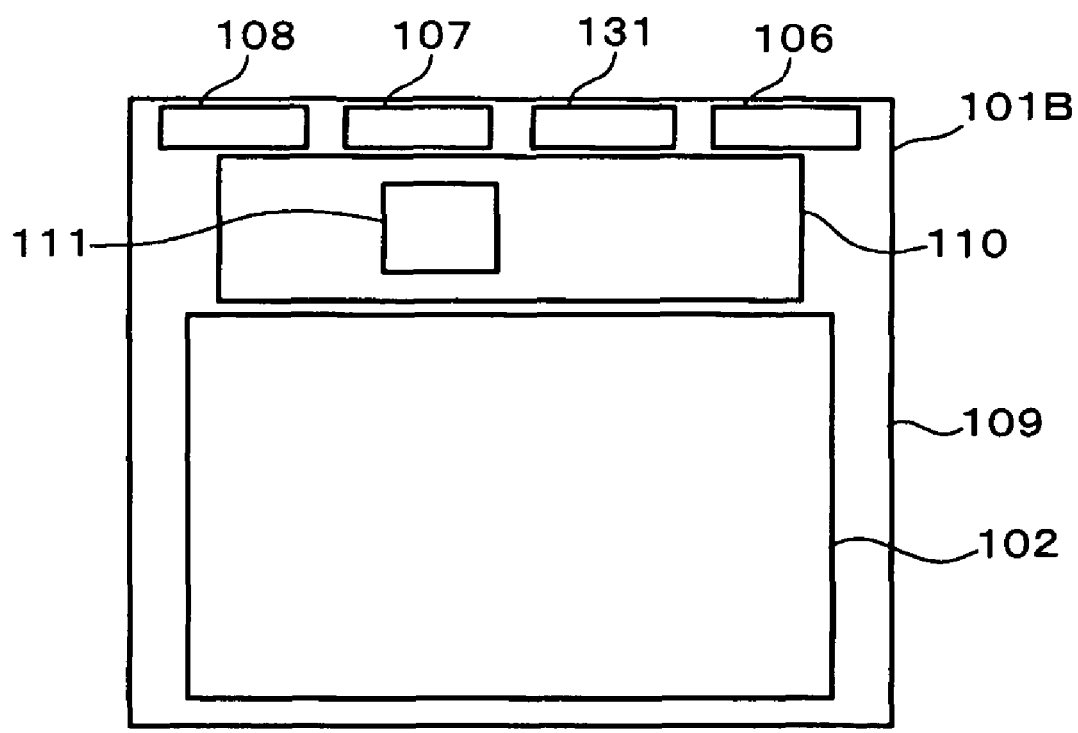
FIG. 12 is a schematic diagram showing the internal structure of the second example of the battery pack.

FIG. 11 shows the structure of another example of a battery pack according to the present invention. In FIG. 11, reference numeral 101B represents a battery pack according to the present invention. FIG. 12 shows the internal structure of the battery pack 101B. As with the foregoing battery pack 101A, in the battery pack 101B, a voltage converter and protecting circuit 103 is connected to a secondary battery 102 through electric wiring 104. The battery pack 101B has external terminals 106, 107, 108, and 131 connected to the voltage detector and protecting circuit 103 through electric wiring 105. The external terminal 131 is an input terminal for a start signal of a voltage converter 111. The secondary battery 102 and the voltage converter and protecting circuit 103 are housed in a case 109. The voltage converter 111 of the voltage converter and protecting circuit 103 is mounted on a substrate 110. The protecting circuit is mounted on the rear surface of the substrate 110. Adjacent to the substrate 110 is disposed the secondary battery 102. The voltage converter 111 may be disposed in the secondary battery 102.

Sixth Embodiment

Figure 13:
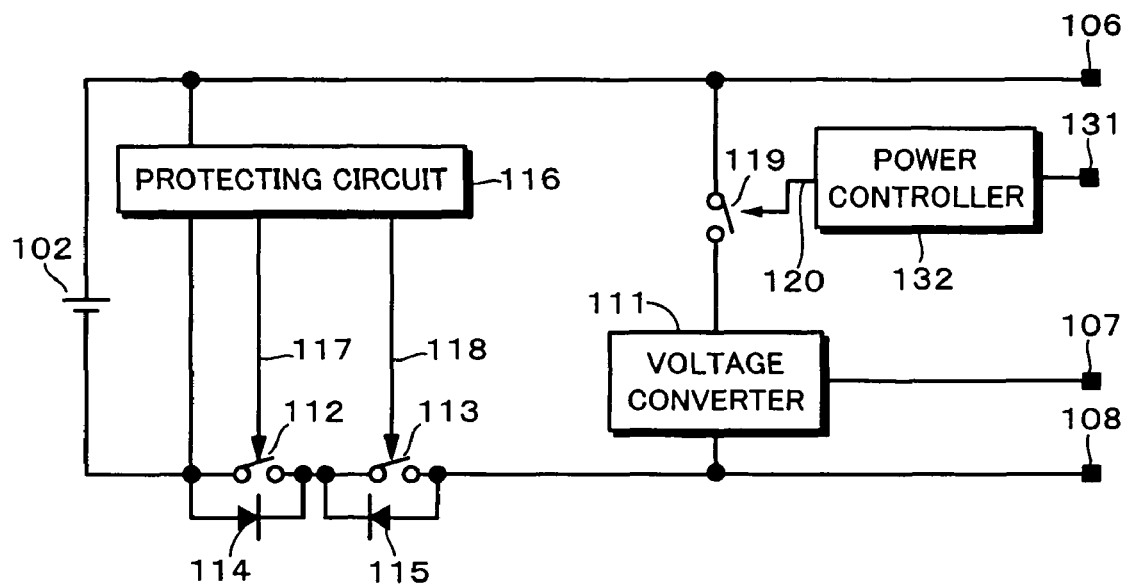
FIG. 13 is a schematic diagram showing the structure of a battery pack according to a sixth embodiment of the present invention.

FIG. 13 shows the structure of a battery pack according to a sixth embodiment of the present invention. The battery pack according to the sixth embodiment is denoted by reference numeral 101B. The battery pack 101B has four external terminals 106, 107, 108, and 131 that are the same as those shown in FIG. 11 and FIG. 12. A power controller 132 generates a power control signal 120. The power controller 132 controls a power controller 132 with the power control signal 120.

A voltage converter start signal is supplied from the external terminal 131 to the power controller 132. The structure of the battery pack 101B according to the sixth embodiment is the same as the structure of the battery pack according to the fourth embodiment shown in FIG. 9 except for the power switch 119. Thus, similar portions are denoted by similar reference numerals and their description will be omitted.

The voltage converter start signal is supplied from the outside of the battery pack 101B. The voltage converter start signal is a signal whose voltage is varied depending on whether the power supply of an electronic device for example a cellular phone to which the battery pack 101B is connected is turned on/off. The cellular phone side generates the voltage converter start signal. When the battery pack 101B has been connected to the cellular phone and the power thereof has been turned on, the voltage of the start signal becomes a preset voltage or higher (for example, 2.0 V or higher). When the power has been turned off, the voltage of the start signal is lower than the present voltage.

The power controller 132 generates a power control signal 120 that causes the power switch 119 to be turned on when the voltage of the start signal is the preset voltage or higher and the power switch 119 to be turned off when the voltage of the start signal is lower than the present voltage (for example, 1.9 V or lower).

Thus, when the voltage converter power switch 119 is controlled, the current consumption of the voltage converter 111 can be decreased. Thus, when the residual discharging capacity of the battery is low, the residual discharging capacity can be prevented from decreasing. In addition, when the voltage converter power switch 119 is controlled with the start signal, if the battery pack has not been connected to the electronic device or the power of the electronic device to which the battery pack has been connected has been turned off, the current consumption of the voltage converter 111 can be decreased. According to the sixth embodiment, only when the output voltage of the voltage converter 111 is required, the power of the voltage converter 111 is turned on and the voltage converter 111 is operated.

Figure 14:
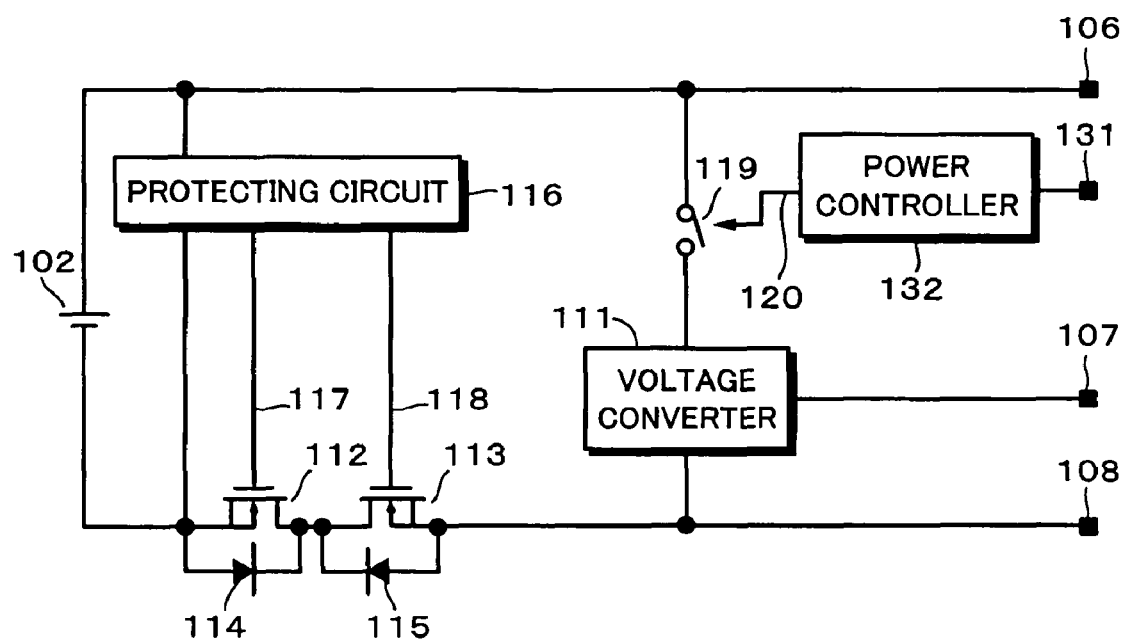
FIG. 14 is a schematic diagram showing the connections of the battery pack according to the sixth embodiment of the present invention in the case that the switches are composed of FETs.

FIG. 14 shows the structure of the battery pack according to the sixth embodiment shown in FIG. 13 in the case that the discharging current switch 112 and the charging current switch 113 are composed of N channel type FETs 112 and 113. The structure of the battery pack shown FIG. 14 is the same as the structure of the battery pack shown in FIG. 13 except that the discharging current switch 112 and the charging current switch 113 are composed of N channel type FETs 112 and 113, respectively. The discharging current switch 112 and the charging current switch 113 according to each of other embodiments may be composed of FETs.

Seventh Embodiment

Figure 15:
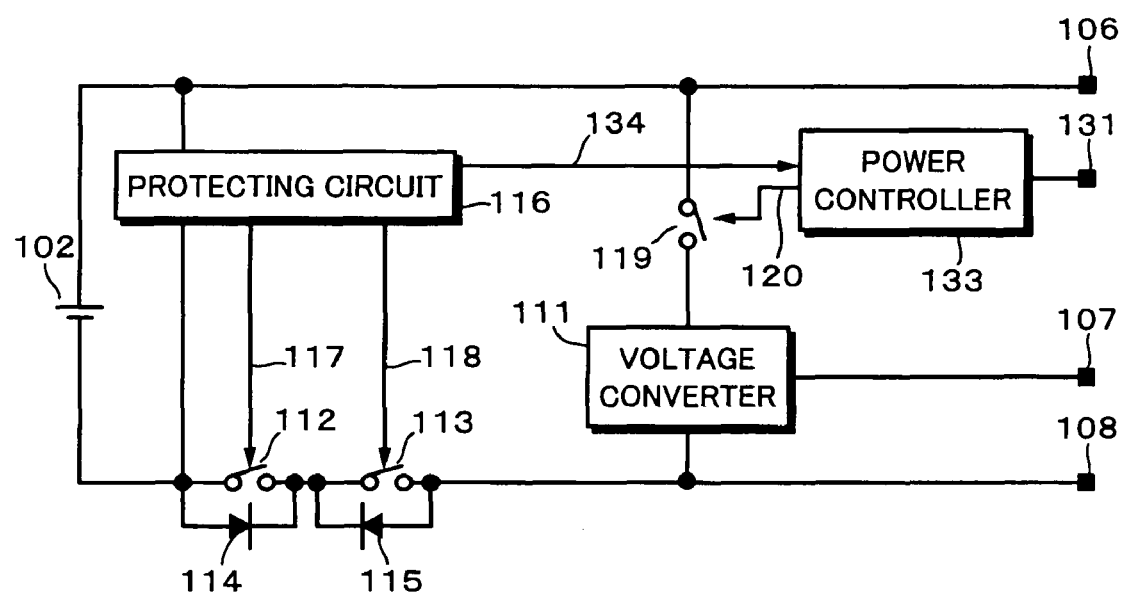
FIG. 15 is a schematic diagram showing the connection of a battery pack according to a seventh embodiment of the present invention.

FIG. 15 shows the structure of a battery pack according to a seventh embodiment of the present invention. The battery pack according to the seventh embodiment is denoted by 101B. The battery pack 101B has four external terminals 106, 107, 108, and 131. A power controller 133 generates a power control signal 120 that controls a power switch 119 of a voltage converter 111.

A voltage converter start signal is supplied from the external terminal 131 to the power controller 133. In addition, an overdischarge non-detection signal 134 is supplied from an protecting circuit 116 to the power controller 133. The structure of the battery pack 101B shown in FIG. 15 is the same as the structure of the battery pack according to the fourth embodiment shown in FIG. 9 except for the control of the voltage converter power switch 119. Thus, similar portions are denoted by similar reference numerals and their description will be omitted.

The protecting circuit 116 generates a discharge control signal. When the voltage of the secondary battery 102 becomes for example 2.49 V or lower, the protecting circuit 116 determines that the secondary battery 102 overdischarge electricity and causes the discharging control signal 117 to become for example "0." As a result, a discharging current switch 112 is turned off. As with the discharging control signal 117, when the secondary battery 102 is normally operating, the protecting circuit 116 causes the overdischarge non-detection signal 134 to become "1." When the secondary battery 102 is overdischarging electricity, the protecting circuit 116 causes the overdischarge non-detection signal 134 to become "0."

Only when the overdischarge non-detection signal 134 is "1," namely the secondary battery 102 is normally operating, the power controller 133 generates the power control signal 120 that causes the power switch 119 to be turned on. In other words, as with the sixth embodiment, according to the seventh embodiment, although the power control signal 120 that is varied in accordance with the voltage of the voltage converter start signal that is input from the external terminal 131 is generated, when the protecting circuit 116 detects the state of which the battery voltage is lower than the preset voltage, the overcharge non-detection signal 134 becomes "0." The power controller 133 does not generate the power control signal 120 that causes the power switch 119 to be turned on regardless of the voltage of the voltage converter start signal.

As with the sixth embodiment, according to the seventh embodiment, when the battery pack 101B has not been connected to the electronic device, the current consumption of the voltage converter 111 can be decreased. When the power of the electronic device has been turned off, the current consumption of the voltage converter 111 can be decreased. In addition, according to the seventh embodiment, when the protecting circuit 116 has detected the state of which the voltage of the secondary battery 102 is the preset voltage or lower, the protecting circuit 116 prevents a current from flowing in the voltage converter 111. As a result, the secondary battery 102 can be prevented from overdischarging electricity.

Figure 16:
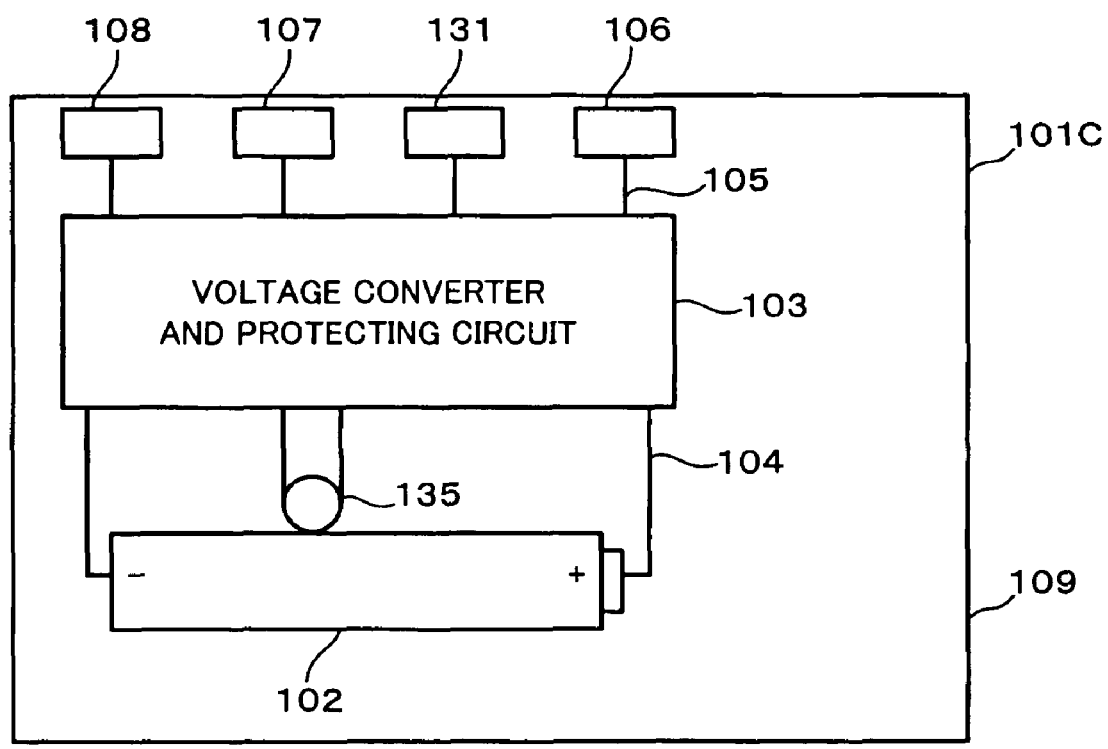
FIG. 16 is a schematic diagram showing the structure of a third example of a battery pack according to the present invention.

FIG. 16 shows the structure of another example of a battery pack according to the present invention. The battery pack shown in FIG. 16 is denoted by reference numeral 101C. As with the foregoing battery packs 101A and 101B, in the battery pack 101C, a voltage converter and protecting circuit 103 is connected to a secondary battery 102 through electric wiring 104. The Battery pack 101C has external terminals 106, 107, 108, and 131 that are connected to the voltage converter and protecting circuit 103 through electric wiring 105.

In contact with or adjacent to the secondary battery 102 is disposed a battery temperature sensor 135 that detects the temperature of the secondary battery 102. The secondary battery 102, the voltage converter and protecting circuit 103, and the battery temperature sensor 135 are housed in a case 109.

Eighth Embodiment

Figure 17:
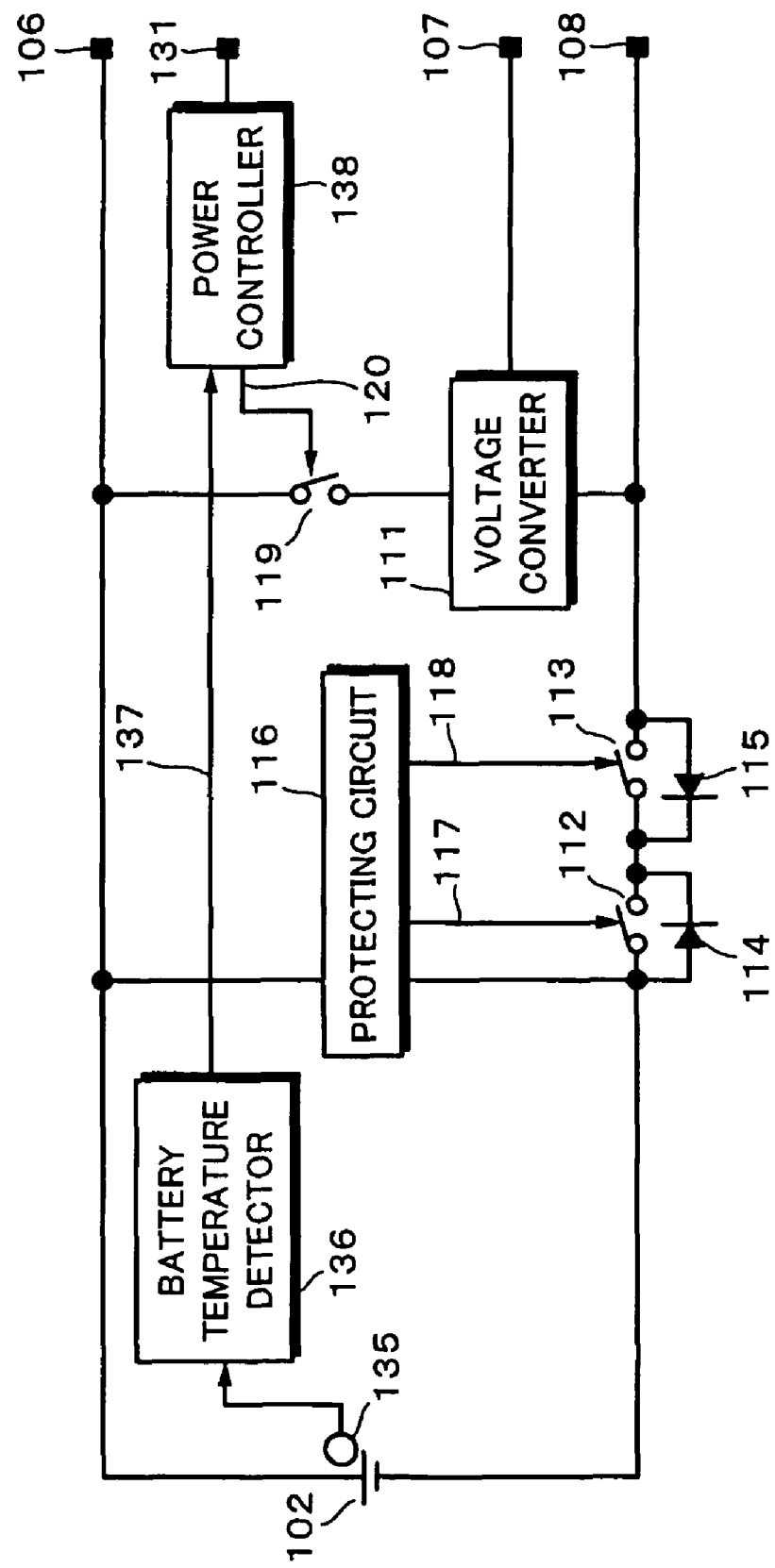
FIG. 17 is a schematic diagram showing the structure of a battery pack according to an eighth embodiment of the present invention.

FIG. 17 shows the structure of a battery pack according to an eighth embodiment of the present invention. The battery pack according to the eighth embodiment is denoted by 101C. The battery pack 101C has four external terminals 106, 107, 108, and 131 and a battery temperature sensor 135. As with the seventh embodiment, a power controller 138 generates a power control signal 120 that controls a power switch 119 of a voltage converter 111.

A voltage converter start signal is supplied from the external terminal 131 to the power controller 138. In addition, a battery temperature abnormality detection signal 137 is supplied from a battery temperature detector 136 to the power controller 138. Since the structure of the battery pack 101C according to the eighth embodiment shown in FIG. 17 is the same as the structure of the battery pack according to the fourth embodiment shown in FIG. 9 except for the control of the power switch 119, similar portions are denoted by similar reference numeral and their description will be omitted.

According to the seventh embodiment, the battery protection signal and the voltage conversion start signal are supplied to the power controller 133. In contrast, according to the eighth embodiment, the battery temperature abnormality detection signal 137 and the voltage converter start signal are supplied from the battery temperature detector 136 to the power controller 138. When the temperature of a secondary battery 102 becomes an abnormally high temperature for example 80° C. or higher, the battery temperature abnormality detection signal 137 becomes "0." Otherwise, the battery temperature abnormality detection signal 137 is "1."

When the battery temperature abnormality detection signal 137 is "1," namely only in the normal state that the secondary battery 102 is normally operating, the power controller 138 generates a power control signal 120 that causes the power switch 119 to be turned on. Although the power control signal 120 is generated in accordance with the voltage of the voltage converter start signal that is input from the external terminal 131. If the battery temperature detector 136 has detected an abnormally high temperature of the secondary battery 102, the battery temperature abnormality detection signal 137 becomes "0." As a result, a power controller 133 does not output the power control signal 120 that causes the power switch 119 to be turned on regardless of the voltage of the voltage converter start signal.

According to the eighth embodiment, when the battery pack 101C has not been connected to the electronic device, the current consumption of the voltage converter 111 can be decreased. Thus, when the power of the electronic device has been turned off, the current consumption of the voltage converter 111 can be decreased. In addition, according to the eighth embodiment, when the temperature of the secondary battery becomes abnormally high, the power of the voltage converter is turned off and the discharging of the battery pack 101C is stopped. As a result, the temperature of the battery pack 101C can be prevented from rising.

Figure 18:
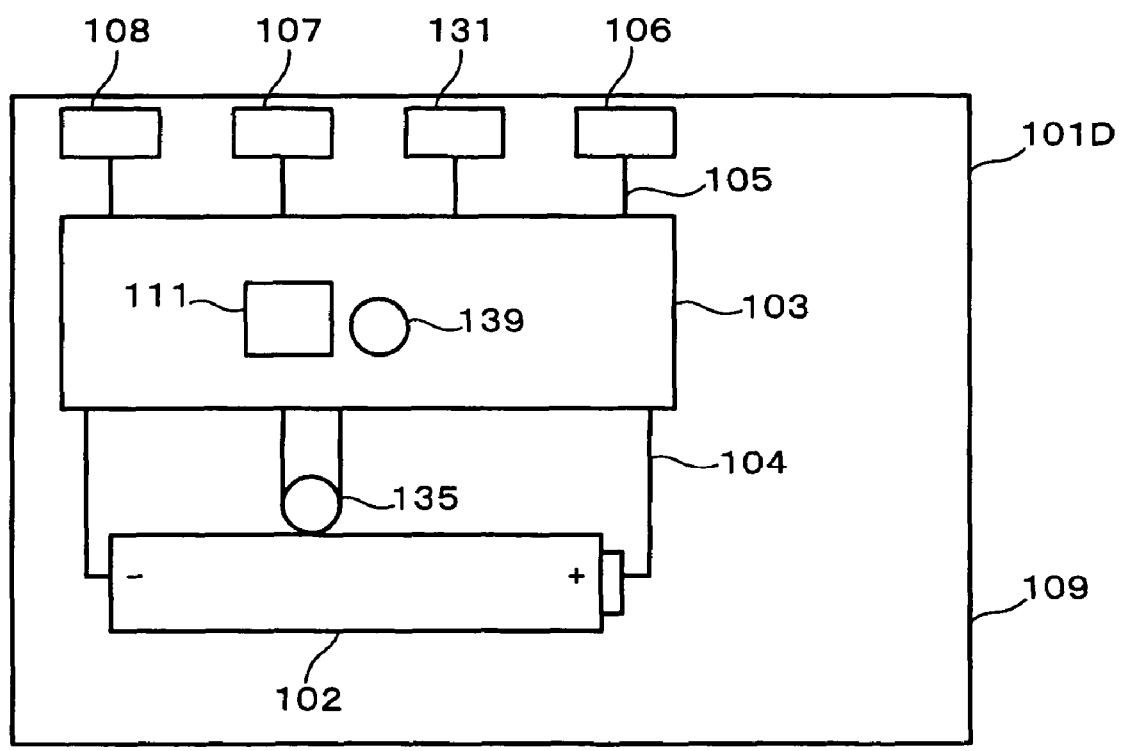
FIG. 18 is a schematic diagram showing the structure of a fourth example of a battery pack according to the present invention.

FIG. 18 shows the structure of another example of a battery pack according to the present invention. The battery pack shown in FIG. 18 is denoted by reference numeral 101D. As with the foregoing battery packs 101A and 101B, in the battery pack 101D, a voltage converter and protecting circuit 103 are connected to a secondary battery 102 through electric wiring 104. The battery pack 101D has external terminals 106, 107, 108, and 131 that are connected to the voltage converter and protecting circuit 103 through electric wiring 105. In addition, as with the battery pack 101C, in the vicinity of the secondary battery 102 is disposed a battery temperature sensor 135 that detects the temperature of the secondary battery 102.

In addition, in the battery pack 101D, a voltage converter temperature sensor 139 is disposed in contact with or adjacent to the voltage converter 111. The voltage converter temperature sensor 139 detects the temperature of the voltage converter 111. The secondary battery 102, the voltage converter and protecting circuit 103, the battery temperature sensor 135, and the voltage converter temperature sensor 139 are housed in a case 109.

Ninth Embodiment

Figure 19:
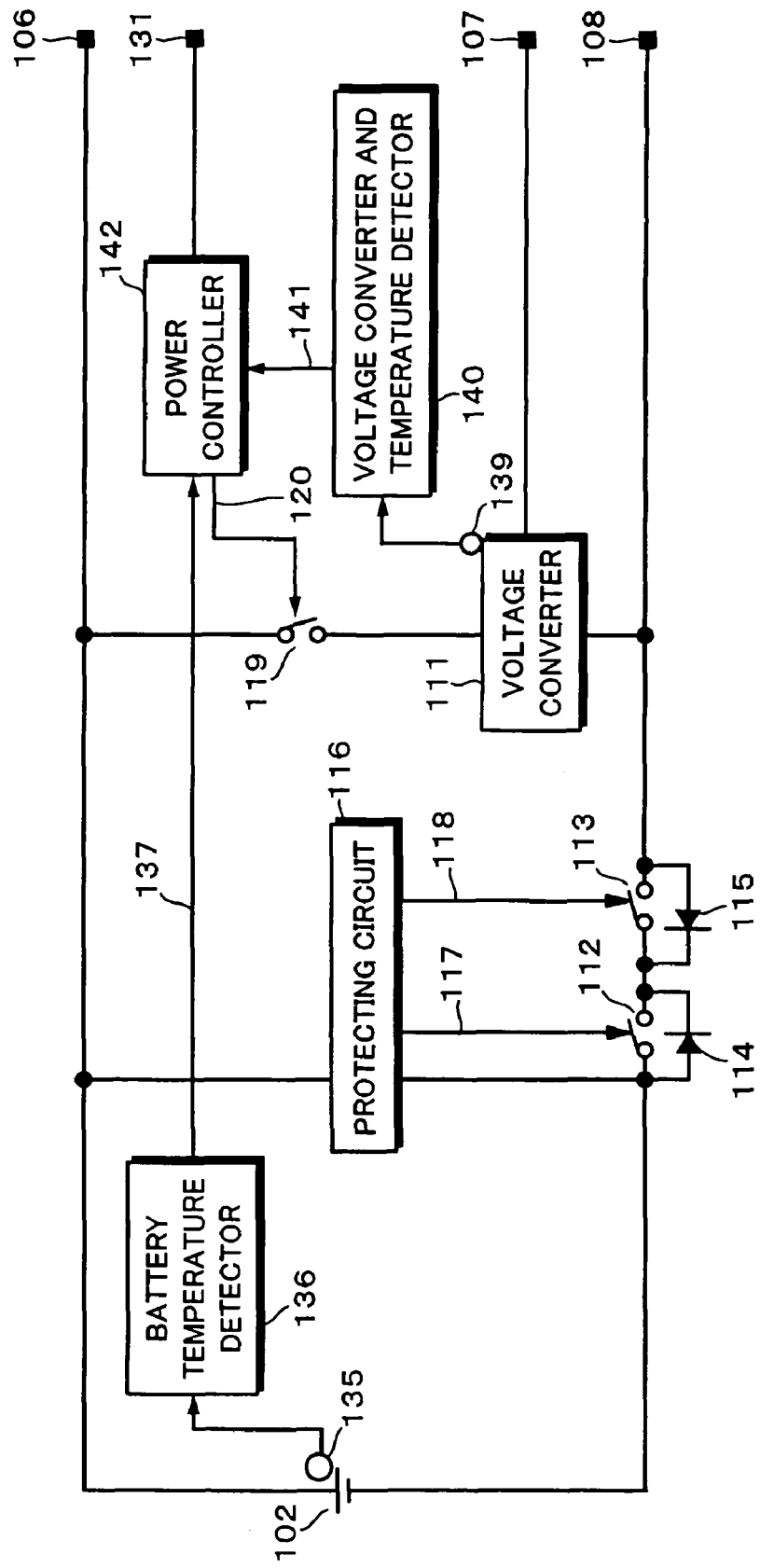
FIG. 19 is a schematic diagram showing the structure of a battery pack according to a ninth embodiment of the present invention.

FIG. 19 shows the structure of a battery pack according to a ninth embodiment of the present invention. The battery pack shown in FIG. 19 is denoted by reference numeral 101D. The battery pack 101D has four external terminals 106, 107, 108, and 131, a battery temperature sensor 135, and a voltage converter temperature sensor 139. A power controller 142 generates a power control signal 120 that controls a power switch 119 of a voltage converter 111.

As with the eighth embodiment, according to the ninth embodiment, a voltage converter start signal is supplied from the external terminal 131 to the power controller 142. In addition, a battery temperature abnormality detection signal 137 is supplied from a battery temperature detector 136 to the power controller 142. Moreover, a voltage converter temperature abnormality detection signal 141 is supplied from a voltage converter temperature detector 140 to the power controller 142. The structure of the battery pack 101D according to the ninth embodiment shown in FIG. 19 is the same as the structure of the battery pack according to the fourth embodiment shown in FIG. 9 except for the control of the power switch 119. Thus, similar portions are denoted by similar reference numerals and their description will be omitted.

According to the ninth embodiment, when the temperature of the secondary battery 102 becomes abnormally high, for example 80° C. or higher, the voltage of the battery temperature abnormality detection signal 137 that is output from the battery temperature detector 136 becomes "0." In this case, the power controller 142 generates the power control signal 120 that causes the power switch 119 to be turned on regardless of the voltage of the voltage converter start signal that is input from the external terminal 131 and the voltage converter temperature abnormality detection signal 141.

When the temperature of the voltage converter 111 becomes abnormally high for example 80° C. or higher, the voltage converter temperature detector 140 determines that the voltage converter 111 is not normally operating and causes the voltage converter temperature abnormality detection signal 141 to become "0." If a capacitor of the voltage converter 111 short-circuits, the voltage converter 111 may heat up and the plastic case 109 may melt. In this case, the power controller 142 generates the power control signal 120 that causes the power switch 119 to be turned off regardless of the voltage value of the voltage converter start signal that is input from the external terminal 131 and the battery temperature abnormality detection signal 137. As a result, the voltage converter 111 is stopped.

According to the ninth embodiment, when the battery pack 101D has not been connected to the electronic device, the current consumption of the voltage converter 111 can be decreased. Thus, when the power of the electronic device has been turned off, the current consumption of the voltage converter 111 can be decreased. In addition, according to the ninth embodiment, when the temperature of the secondary battery or the temperature of the voltage converter becomes abnormally high, the power of the voltage converter is turned off and the discharging of the battery pack 101D is stopped. As a result, the temperature of the battery pack 101D can be prevented from rising.

The number of voltage converters disposed in the battery pack may be two or more rather than one. When one voltage converter is used, it may generate a plurality of output voltages. In addition, the start signal may not be a signal whose voltage is varied in accordance with the state of which the power of the electronic device is turned on/off, but a signal whose current is varied, a signal whose pulse width is varied, a digital signal whose code is varied, or the like. In addition, the present invention can be applied to a structure that does not have a protecting circuit.

Figure 20:
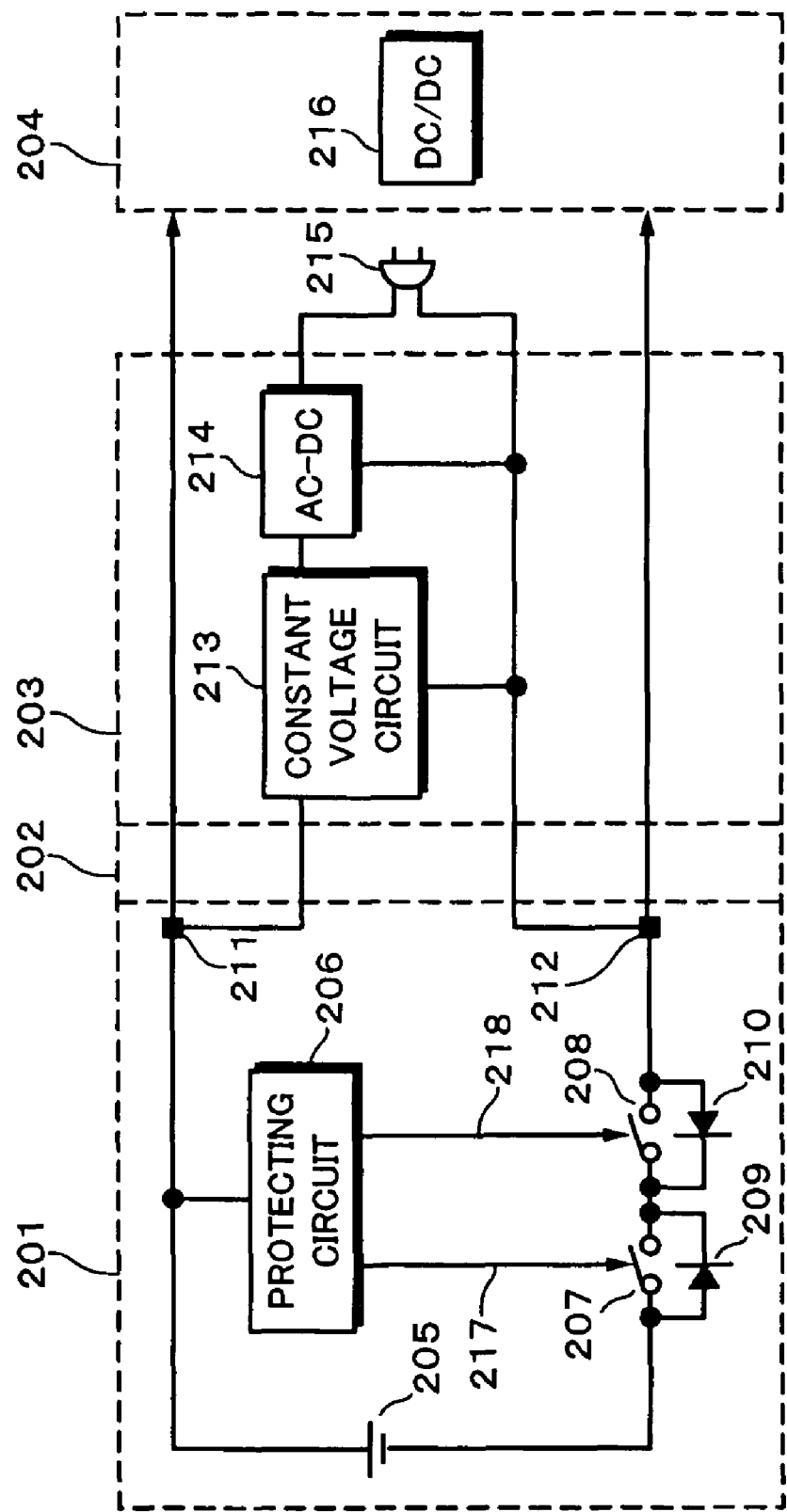
FIG. 20 is a block diagram showing the structure of a battery pack, a cradle, an AC adaptor, and a mobile device according to the present invention.

As described above, battery packs have been used for portable electronic devices such as cellular phones and digital cameras. FIG. 20 shows the structure of a battery pack according to the present invention. The battery pack shown in FIG. 20 is used for a portable electronic device (hereinafter referred to as mobile device).

In FIG. 20, reference numeral 201 represents a battery pack. Reference numeral 202 represents a cradle. Reference numeral 203 represents an AC adaptor. Reference numeral 204 represents a mobile device. The battery pack 201 has a secondary battery 205, a protecting circuit 206, a discharging controlling switch 207, and a charging controlling switch 208. Since these switches 207 and 208 are normally composed of FETs, parasitic diodes 209 and 210 are disposed in parallel therewith. The switches 207 and 208 are controlled in accordance with a discharging control signal 217 and a charging control signal 218, respectively, supplied from the protecting circuit 206.

The battery pack 201 has a plus electrode side external terminal 211 and a minus electrode side external terminal 212. The AC adaptor 203 is connected to the terminals 211 and 212 through the cradle 202. Alternatively, the mobile device 204 is connected to the terminals 211 and 212 through the cradle 202.

The AC adaptor has a constant voltage circuit 213 and an AC-DC converter 214. A commercial AC power received from an AC plug (sometimes referred to as AC inlet) 215 is rectified by the AC-DC converter 214. The constant voltage circuit 213 converts the rectified voltage into a predetermined charging voltage. The charging voltage is applied to the external terminals 211 and 212. The secondary battery 205 is charged with the charging voltage.

In addition, the mobile device 204 is connected to the terminals 211 and 212. The battery voltage is supplied to a discharging circuit of the mobile device 204. Since the mobile device 204 needs another voltage that is different from the battery voltage, the mobile device 204 has a DC-DC converter 216. As with a cellular phone having a camera, when the cellular phone has many functions, it needs a plurality of DC-DC converters corresponding to a plurality of DC voltages.

Unlike with the example of the structure shown in FIG. 20, an electronic device that contains a battery pack 201, an AC adaptor 203, and an AC inlet through which the battery pack 201 is charged has been proposed (for example Japanese Patent Laid-Open Publication No. HEI 11-185824).

As described above, the conventional battery pack 201 needs the cradle 202 and the AC adaptor 203 so as to charge the battery pack 201. When the electronic device contains the battery pack 201, the AC adaptor 203, and the AC inlet, the electronic device should have many external terminals including those for the AC inlet. Thus, the number of terminals of the electronic device is adversely increased.

Thus, it is preferred to provide a battery pack that can be charged using a small number of external terminals without need to use a cradle and an AC adaptor.

Tenth Embodiment

Figure 21:
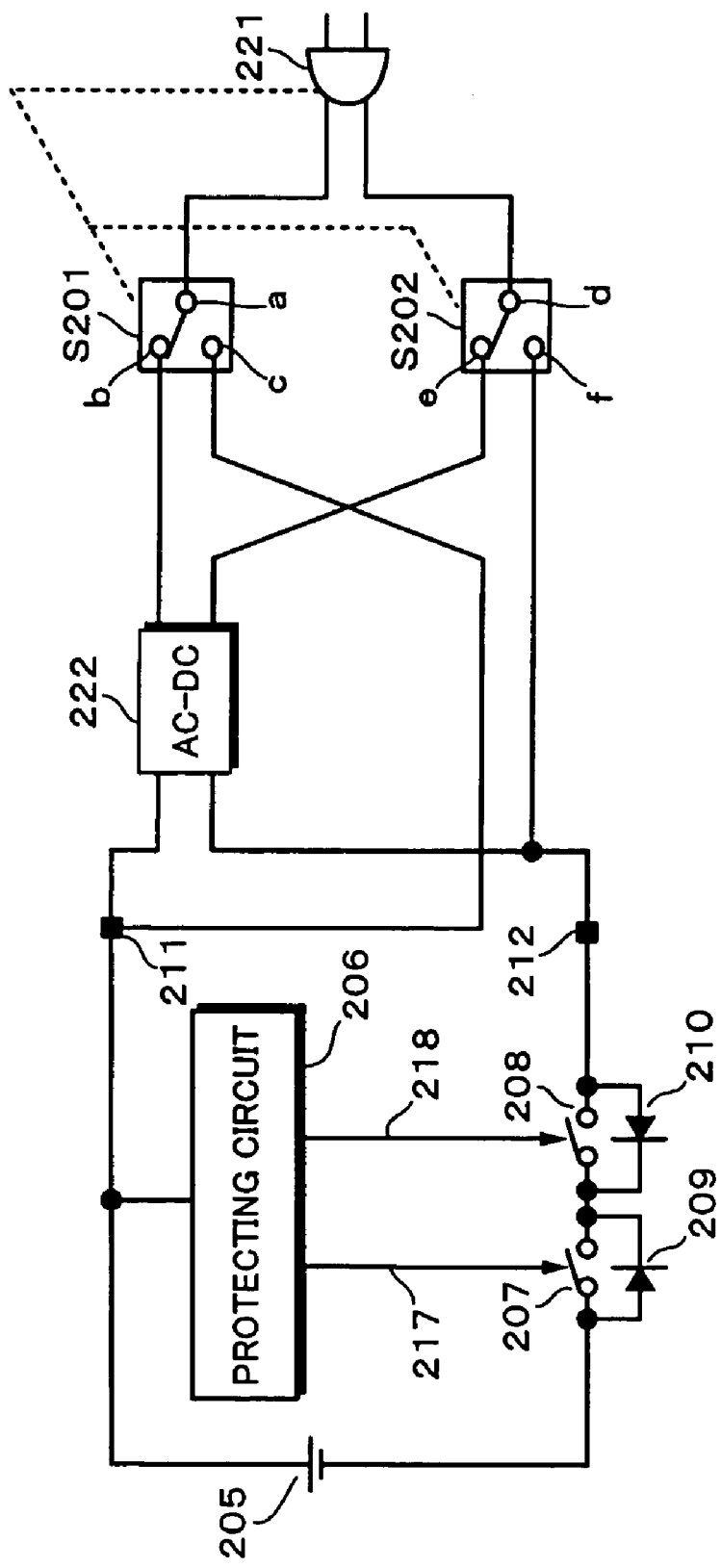
FIG. 21 is a schematic diagram showing the structure of a battery pack according to a tenth embodiment of the present invention.

FIG. 21 shows the structure of a battery pack according to a tenth embodiment of the present invention. As with the conventional structure, in the battery pack according to the tenth embodiment, a plus electrode of a secondary battery 205 is connected to an external terminal 211. A minus electrode of the secondary battery 205 is connected to an external terminal 212 through a discharging controlling FET 207 and a charging controlling switch 208. A protecting circuit 206 controls the charging switch 207 and the discharging switch 208.

When the secondary battery 205 is a lithium ion battery, it is for example a box shaped battery. The secondary battery 205 is housed in a steel battery case. When the secondary battery 205 is a lithium polymer battery, it is sealed with an aluminum laminate film. The secondary battery 205 may be a new type secondary battery that will be developed in future.

Reference numeral 221 represents an AC plug of the battery pack. The AC plug 221 can be fit to an outlet of a commercial AC power. The AC plug 221 has a pair of conductive blades. According to the present invention, the conductive blades are used in common with charging terminals and discharging terminals.

The AC plug 221 has a charging operation state of which the AC plug 221 is inserted into an AC outlet (hereinafter referred to as first operation state) and a discharging operation state of which power is supplied to the electronic device (hereinafter referred to as second operation state). The battery pack has bi-directional switches S201 and S202 whose switch positions are changed in accordance with the operation state of the AC plug 221. The practical structures of the AC plug 221 and the switches S201 and S202 will be described later in detail.

A terminal a of the switch S201 is connected to one power line of the AC plug 221. A terminal d of the switch S202 is connected to the other power line of the AC plug 221. A terminal b of the switch S201 is connected to one input terminal of an AC-DC converter 222. A terminal e of the switch S202 is connected to another input terminal of the AC-DC converter 222. A terminal c of the switch S201 and a terminal f of the switch S202 are connected to the external terminals 211 and 212, respectively.

Along with the secondary battery 205 and the protecting circuit 206, the AC-DC converter 222 and the switches S201 and S202 are housed in a relatively hard case made of a material such as plastic. Alternatively, the AC-DC converter 222, the switches S201 and S202, the protecting circuit 206, and so forth may be disposed in the secondary battery 205 other than the case.

In the first operation state of which the AC plug 221 is inserted into the AC outlet, the commercial AC power is input to the AC-DC converter 222 through the output terminals b and e of the switches S201 and S202, respectively. The AC-DC converter 222 outputs a predetermined charging voltage corresponding to the secondary battery 205. The secondary battery 205 is charged with the charging voltage.

In the second operation state of the AC plug 221, the AC plug 221 is connected to the external terminals of the electronic device. In the second operation state, the battery voltage is output to the AC plug 221 through the terminals c and a of the switch S201 and the terminals f and d of the switch S202. The battery voltage is supplied to the electronic device through the AC plug 221.

Eleventh Embodiment

Figure 22:
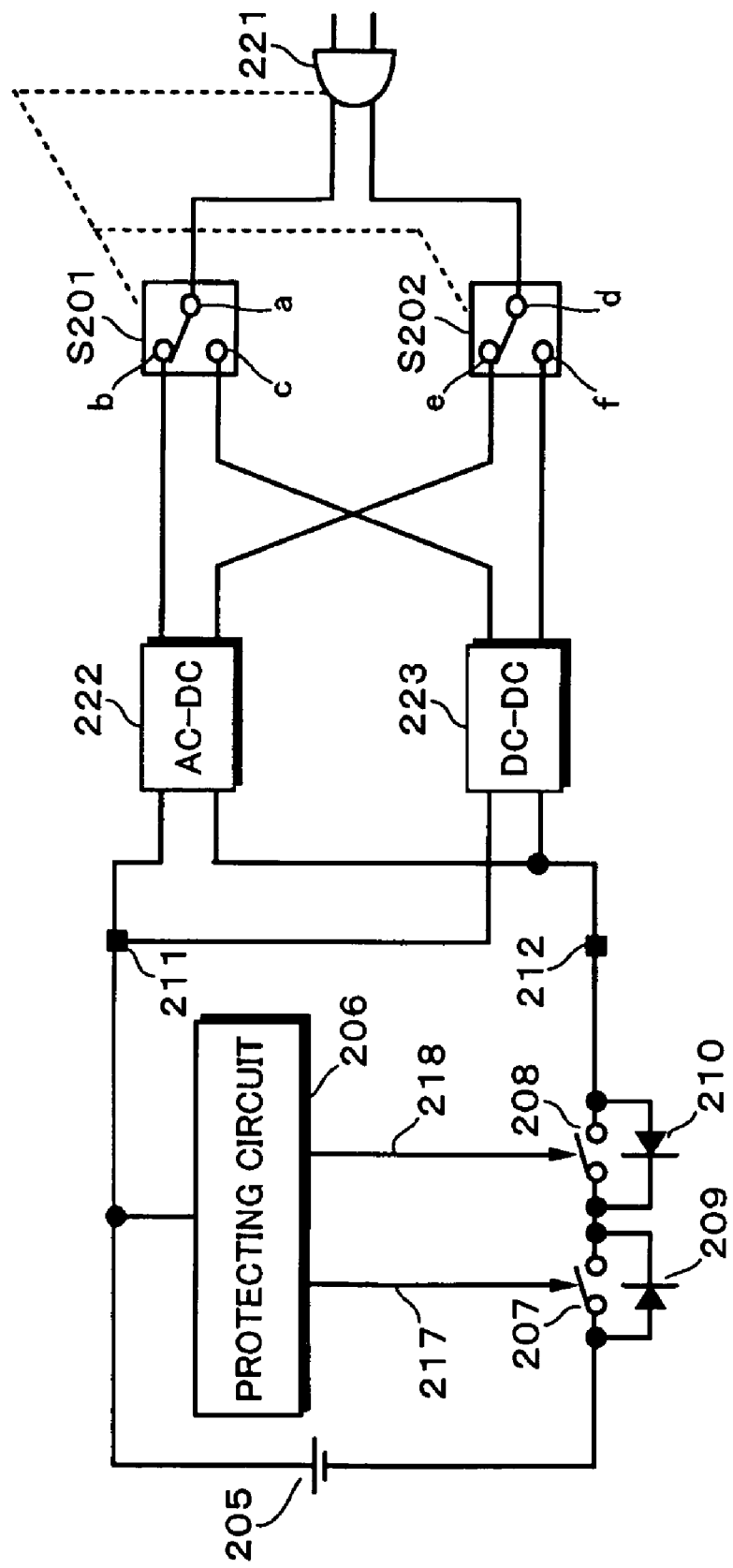
FIG. 22 is a schematic diagram showing the structure of a battery pack according to an eleventh embodiment of the present invention.

FIG. 22 shows the structure of a battery pack according to an eleventh embodiment of the present invention. The structure of the battery pack according to the eleventh embodiment shown in FIG. 22 is the same as the structure of the battery pack according to the tenth embodiment except that a battery pack contains a DC-DC converter 223. Thus, similar portions are denoted by similar reference numerals and their description will be omitted. According to the eleventh embodiment, when an AC plug 221 is placed in a second operation state, a DC voltage raised by a DC-DC converter 223 can be supplied to an electronic device through switches S201 and S202 and the AC plug 221.

The DC-DC converter 223 may be one of various types for example a charge pump type using a capacitor and a switching device, a step-up converter (step-down converter) using a diode, an inductor, a capacitor, and a switching device, or a switching regulator using a transformer and a switching device. Alternatively, the DC-DC converter 223 may be a piezoelectric inverter using a piezoelectric transformer or a series regulator using a bipolar transistor device. As a charge pump type voltage converter or a switching regulator, devices having a size of around 4 mm×4 mm have been developed. Thus, the DC-DC converter 223 can be easily disposed in the battery pack.

Twelfth Embodiment

Figure 23:
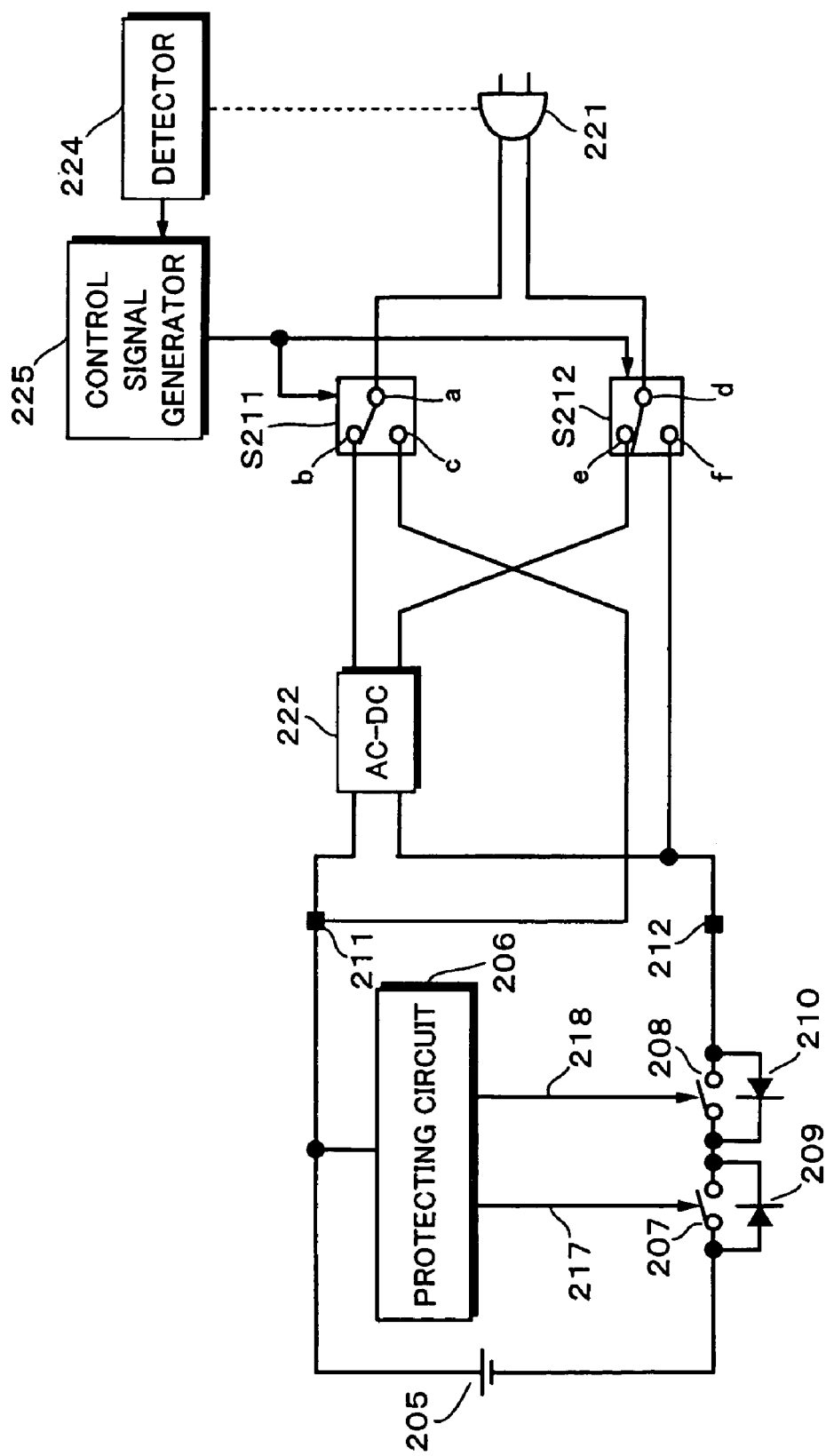
FIG. 23 is a schematic diagram showing the structure of a battery pack according to a twelfth embodiment of the present invention.

FIG. 23 shows the structure of a battery pack according to a twelfth embodiment of the present invention. According to the tenth and eleventh embodiments, the switches S201 and S202 whose switch positions are directly changed in accordance with the operation states of the AC plug 221. In contrast, according to the twelfth embodiment, the operation state of a AC plug 221 is detected. In accordance with a control signal generated in accordance with the detected result of the operation state of the AC plug 221, switches are controlled. Except for those, the structure of the battery pack according to the twelfth embodiment is the same as the structure of the battery pack according to the tenth embodiment. Thus, similar portions are denoted by similar reference numerals and their description will be omitted.

In FIG. 23, reference numeral 224 represents a detector that detects the operation state of the AC plug 221. Reference numeral 225 represents a control signal generating portion that generates a switch control signal in accordance with an output of the detector 224. Several real structures of the detector 224 in accordance with the AC plug 221 will be described later.

When the detector 224 detects a first operations state of which the AC plug 221 is inserted into an AC outlet, the control signal generating portion 225 generates a switch control signal that causes terminals a and b of a switch S211 and terminals d and e of a switch S212 to be connected. In the first operation state, a secondary battery 205 is charged with a charging voltage that an AC-DC converter 222 outputs.

A second operation state of which the AC plug 221 is connected to external terminals of an electronic device is detected by the detector 224. In the second operation state, the control signal generating portion 225 generates a switch control signal that causes the terminals a and c of the switch S211 and the terminals d and f of the switch S212 to be connected. A battery voltage is output to the AC plug 221 through the terminals c and a of the switch S211 and the terminals f and d of the switch S212. The battery voltage is supplied to the electronic device through the AC plug 221. The switches S211 and S212 are contacts of relays, semiconductor switches, or the like.

Thirteenth Embodiment

Figure 24:
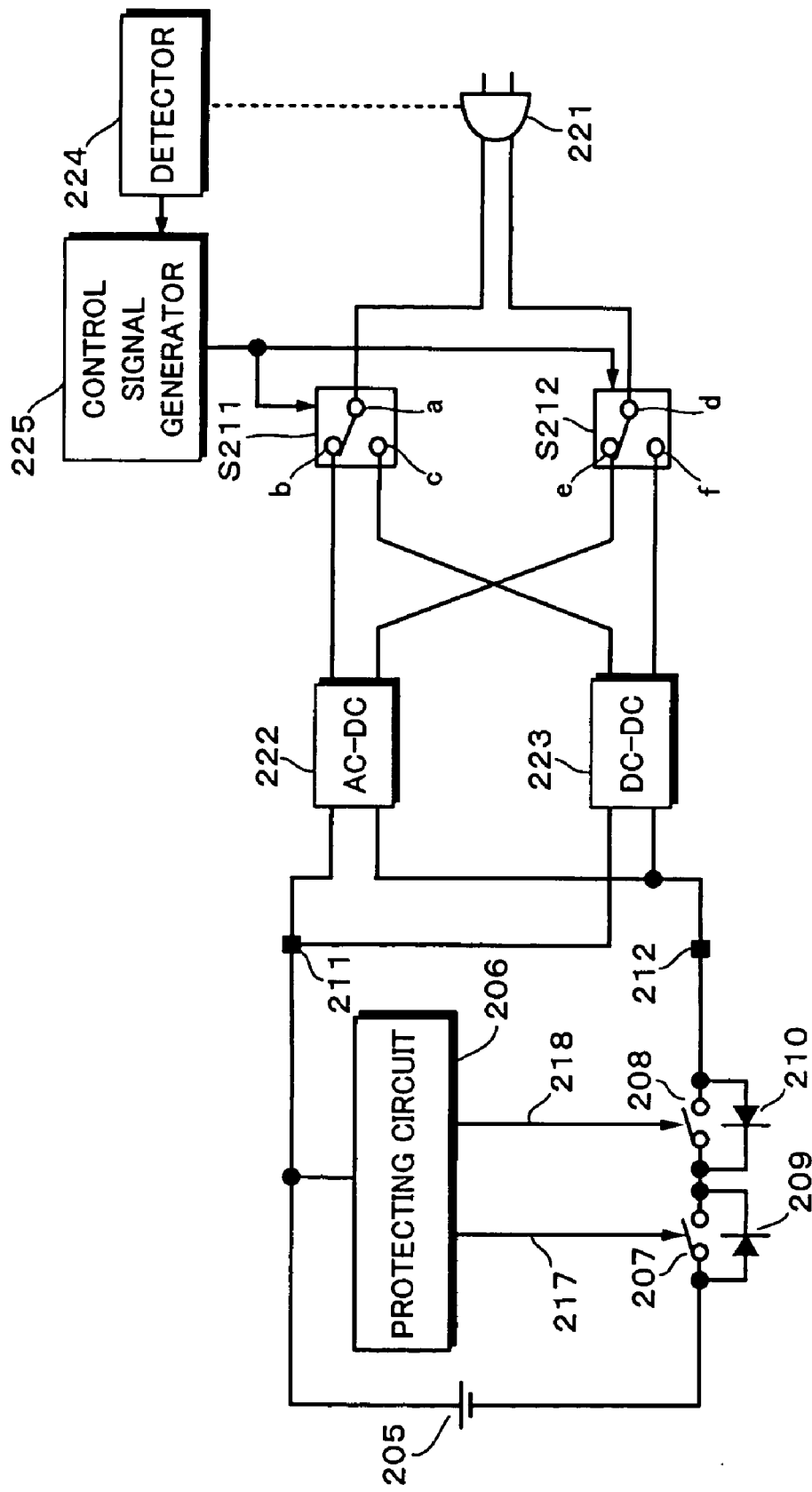
FIG. 24 is a schematic diagram showing the structure of a battery pack according to a thirteenth embodiment of the present invention.

FIG. 24 shows the structure of a battery pack according to a thirteenth embodiment of the present invention. The structure of the battery pack according to the thirteenth embodiment is the same as that according to the twelfth embodiment except that a battery pack contains a DC-DC converter 223. Thus, similar portions are denoted by similar reference numerals and their description will be omitted. According to the thirteenth embodiment, when an AC plug 221 is placed in a second operation state, a DC voltage of which a battery voltage is raised by the DC-DC converter 223 can be supplied to an electronic device through switches S211 and S212 and the AC plug 221.

Fourteenth Embodiment

Figure 25:
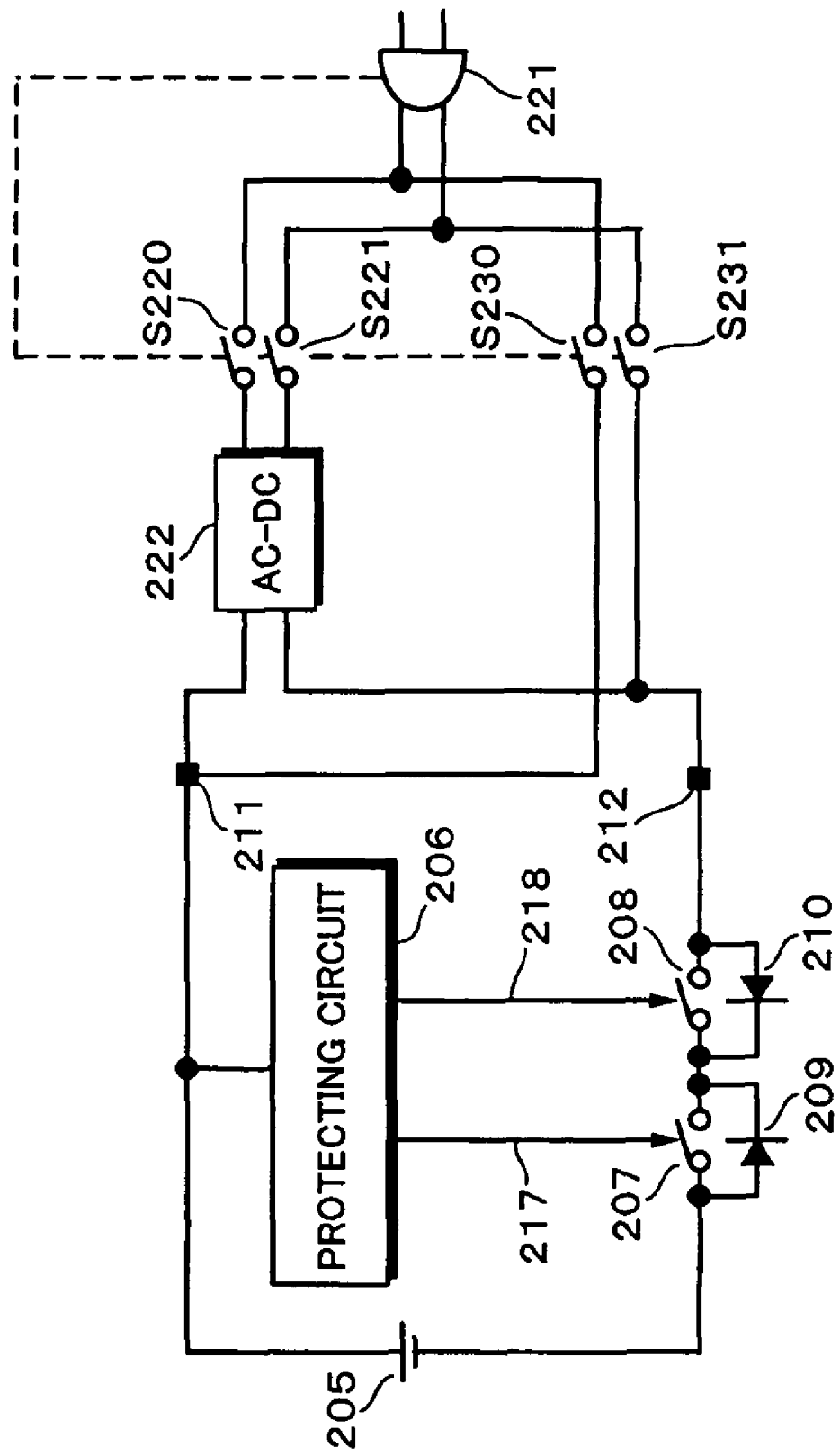
FIG. 25 is a schematic diagram showing the structure of a battery pack according to a fourteenth embodiment of the present invention.

FIG. 25 shows the structure of a battery pack according to a fourteenth embodiment of the present invention. According to the tenth to thirteenth embodiments, switches of which one contact (terminal) is connected to one of two contacts (terminals) are used. In contrast, according to the fourteenth embodiment, switches of which two contacts are synchronously turned on/off are used. In other words, switches S220 and S221 are used instead of the switch S201. In addition, switches S230 and S231 are used instead of the switch S202. Except for those, the structure of the battery pack according to the fourteenth embodiment is the same as the structure of the battery pack according to the tenth embodiment. Thus, similar portions are denoted by similar reference numerals and their description will be omitted.

In a first operation state of which an AC plug 221 is inserted into an AC outlet, the switches S220 and S221 are turned on and the switches S230 and S231 are turned off. Thus, a commercial AC power is input to an AC-DC converter 222 through the switches S220 and S221. The AC-DC converter 222 outputs a predetermined charging voltage corresponding to a secondary battery 205. The secondary battery 205 is charged with the charging voltage.

In a second operation state of which the AC plug 221 is connected to external terminals of an electronic device, the switches S220 and S221 are turned off and the switches S230 and S231 are turned on. Thus, a battery voltage is output to the AC plug 221 through the switches S230 and S231. The battery voltage is supplied to the electronic device through the AC plug 221.

Fifteenth Embodiment

Figure 26:
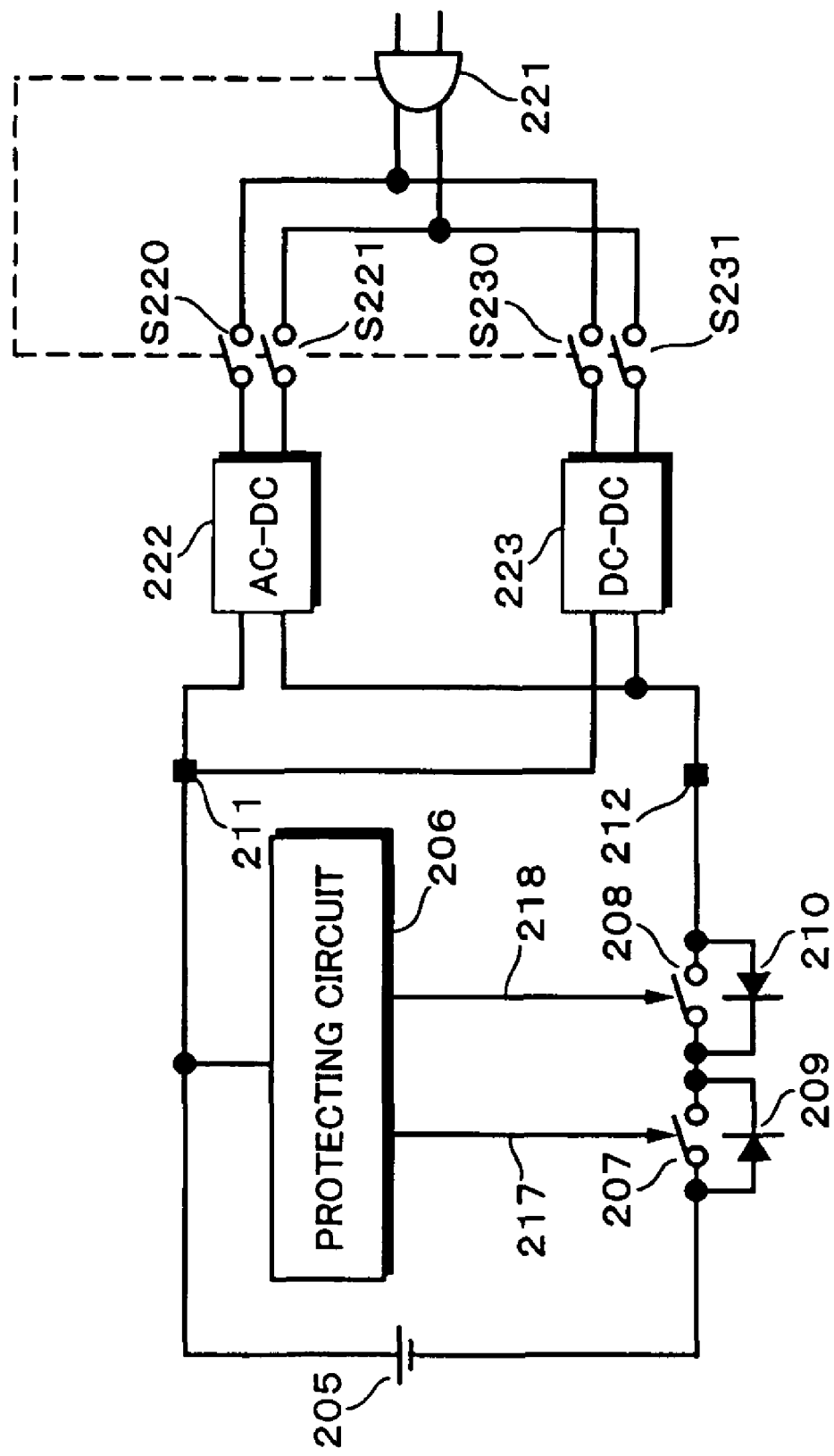
FIG. 26 is a schematic diagram showing the structure of a battery pack according to a fifteenth embodiment of the present invention.

FIG. 26 shows the structure of a battery pack according to a fifteenth embodiment of the present invention. The structure of the battery pack according to the fifteenth embodiment is the same as the structure of the battery pack according to the fourteenth embodiment except that a battery pack contains a DC-DC converter 223. Thus, similar portions are denoted by similar reference numerals and their description will be omitted. According to the fifteenth embodiment, when an AC plug 221 is placed in a second operation state, a DC voltage of which a battery voltage is raised by the DC-DC converter 223 can be supplied to an electronic device through switches S230 and S231 and the AC plug 221.

The operation state of the AC plug 221 is detected. With a control signal (not shown) generated in accordance with the detected result, the switches S220 to S231 can be controlled.

Figure 27:
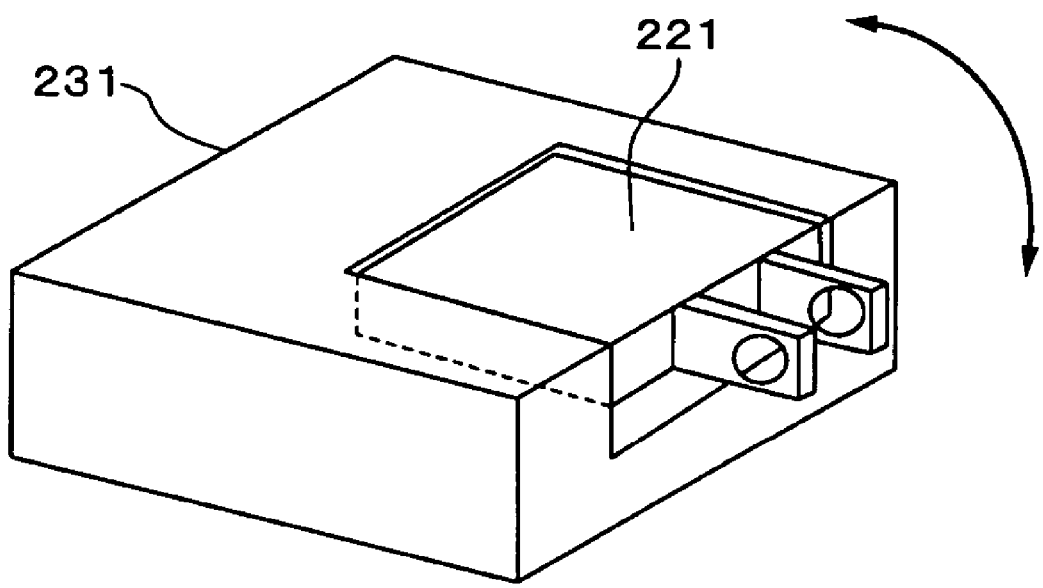
FIG. 27 is a perspective view showing an example of the appearance of a battery pack according to the present invention.

FIG. 27 shows the appearance of the battery pack according to each of the tenth to fifteenth embodiments. Reference numeral 231 represents a case of the battery pack. The AC plug 221 is disposed in a case 231 of the battery pack so that a part of the AC plug 221 is rotatable. The lay-down state of the AC plug 221 shown in FIG. 27, namely the AC plug 221 slightly protrudes from the upper surface of the case 231, is the second operation state. The AC plug 221 is inserted into the electronic device. The DC voltage is supplied to the discharging circuit of the electronic device. In contrast, the state of which the AC plug 221 is rotated by 90° from the lay-down state and the blade portions of the AC plug 221 face upward is the first operation state. In other words, the AC plug 221 is inserted into the AC outlet.

The two rotation positions of the AC plug 221 are held by an internal holding mechanism. The relation of the first and second operation states of the AC plug 221 may be the reverse of the foregoing. When the AC plug 221 is connected to the electronic device in the second operation sate, the conductive blades of the AC plug 221 may be contacted to openings of the electronic device by other than the inserting method. In the second operation state, the conductive blades of the AC plug 221 may be almost housed in the case 231. The conductive blades may be contacted with spring contacts of the electronic device.

In the case 231 of the battery pack, along with the secondary battery 205, the circuit of each of the tenth to fifteenth embodiments is disposed. As the AC plug 221 is rotated, the switch positions are changed. Examples of structures that accomplish the switches S201, S202, S211, S212, S220, S221, S230, and S231 according to the tenth to fifteenth embodiments will be described.

Figure 28A:
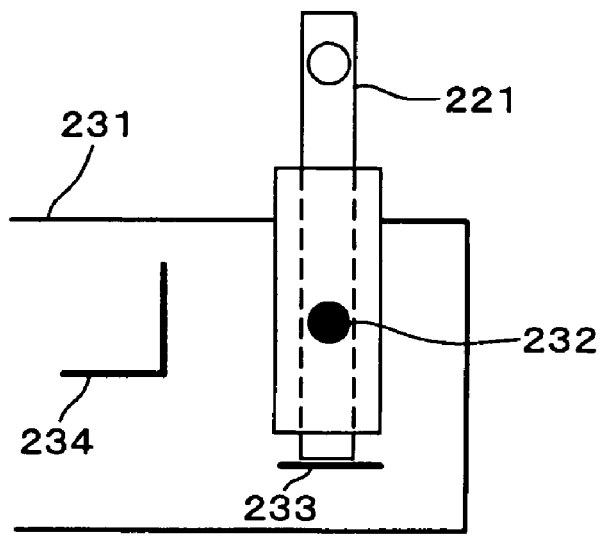
FIG. 28A and FIG. 28B are schematic diagrams showing the structure of a first example of switches whose switch positions are changed in accordance with the state of an AC plug.
Figure 28B:
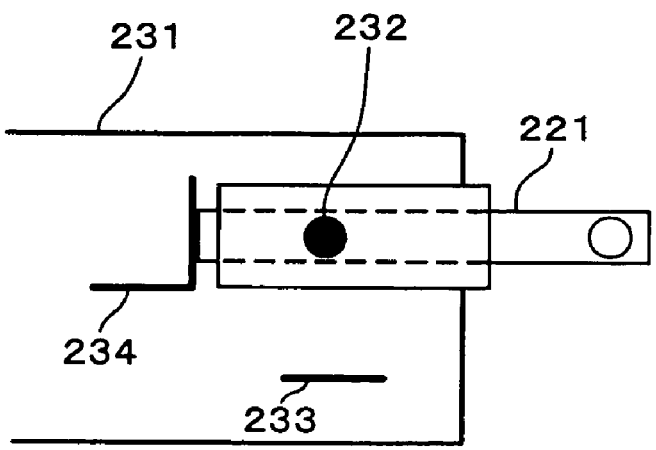

In an example shown in FIG. 28A and FIG. 28B, conductive blades of an AC plug 221 that are rotated about a shaft 232 extend. An edge portion of the conductive blades functions as a contact portion. The contact portion contacts one of spring contacts 33 and 34. In the first operation state (FIG. 28A) of which the AC plug 221 is raised, the contact portion of the AC plug 221 contacts the spring contact 233. In the second operation state (FIG. 28B) of which the AC plug 221 is laid down, the contact portion of the AC plug 221 contacts the spring contact 234. In this example, a pair of contact portions, a pair of spring contacts 233, and a pair of spring contacts 234 are disposed (not shown).

The pair of contact portions correspond to the terminal a of the switch S201 and the terminal d of the switch S202. The pair of spring contacts 233 correspond to the terminal b of the switch S201 and the terminal e of the switch S202. The pair of spring contacts 34 correspond to the terminal c of the switch S201 and the terminal f of the switch S202. In the first operation state shown in FIG. 28A, the terminals a and b of the switch S201 and the terminals d and e of the switch S202 are connected. An AC voltage is supplied to an AC-DC converter 222 through the AC plug 221 and the switches S201 and S202. In the second operation state shown in FIG. 28B, the terminals a and c of the switch S201 and the terminals d and f of the switch S202 are connected. A battery voltage or an output voltage of a DC-DC converter 223 is supplied to the electronic device through the AC plug 221 and the switches S201 and S202. The structure shown in FIG. 28 can be used to accomplish the switches S220, S221, S230, and S231.

Figure 29A:
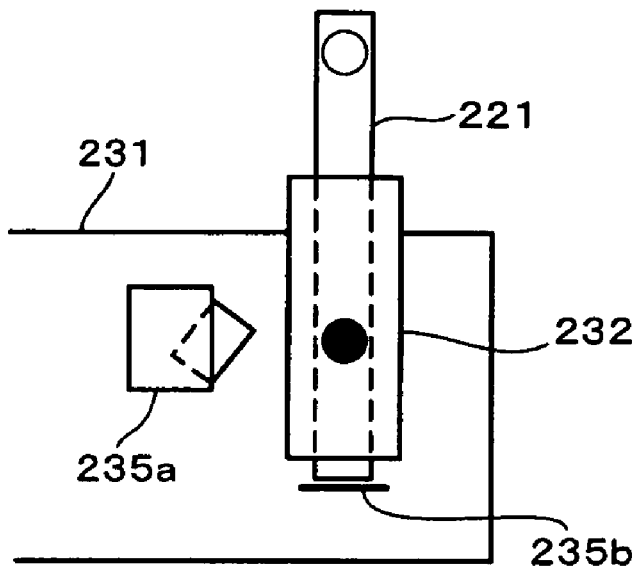
FIG. 29A and FIG. 29B are schematic diagrams showing the structure of a second example of switches whose switch positions are changed in accordance with the state of an AC plug.
Figure 29B:
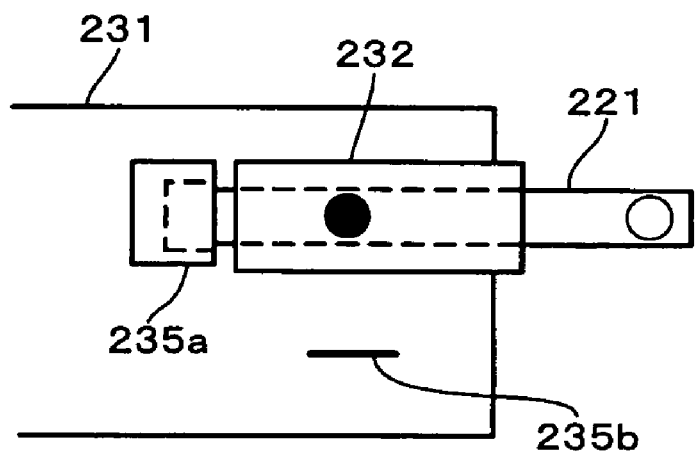

In an example shown in FIG. 29A and FIG. 29B, an edge portion of an AC plug 221 that is rotated about a shaft 232 changes a switch position of a switch 235a. In addition, a spring contact 35b that contacts a contact portion of the AC plug 221 in a second operation state is disposed. In a first operation state (FIG. 29A) of which the AC plug 221 is raised and inserted into an AC outlet, since the contact portion of the AC plug 221 does not contact a movable portion of the switch 235a, it is turned off. The contact portion of the AC plug 221 contacts the spring contact 235b. Thus, an AC power is supplied. In contrast, in a second operation state (FIG. 29B) of which the AC plug 221 is laid down, the contact portion of the edge portion of the AC plug 221 contacts the movable portion of the switch 235a. Thus, the switch 235a is turned on. The spring contact 235b does not contact the contact portion of the edge portion of the AC plug 221.

The switch 235a composes the detector 225 described with reference to FIG. 23 and FIG. 24. A circuit (not shown) that generates a switch control signal in accordance with an output of the switch 235a and switches S211 and S212 are disposed.

In accordance with a control signal generated in the first operation state in which the switch 235a is turned off as shown in FIG. 29A, the terminals a and b of the switch S211 and the terminals d and e of the switch S212 are connected. An AC voltage is supplied to an AC-DC converter 222 through the AC plug 221, the spring contact 35b, and the switches S211 and S212. In accordance with a control signal generated in the second operation state in which the switch 235a is turned on as shown in FIG. 29B, the terminals a and c of the switch S211 and the terminals d and f of the switch S212 are connected. As a result, a battery voltage or an output voltage of a DC-DC converter 223 is supplied to an electronic device through the AC plug 221 and the switches S211 and S212.

Figure 30A:
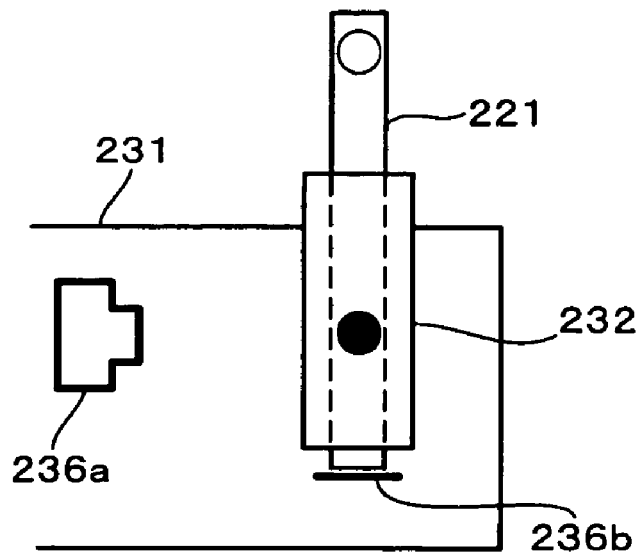
FIG. 30A and FIG. 30B are schematic diagrams showing the structure of a second example of switches whose switch positions are changed in accordance with the state of an AC plug.
Figure 30B:
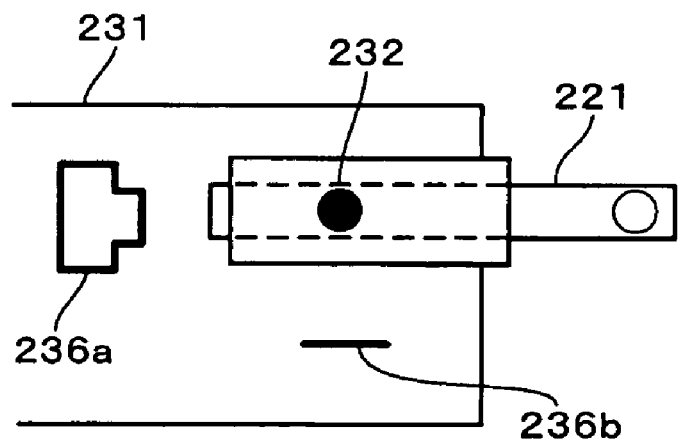

In an example shown in FIG. 30A and FIG. 30B, an edge portion of an AC plug 221 that is rotated by a shaft 232 turns on/off an optical sensor 236a. The optical sensor 236a composes the detector 225 described with reference to FIG. 23 and FIG. 24. A circuit that generates a switch control signal in accordance with an output of the optical sensor 236a and switches S211 and S212 are disposed. When light that is emitted from a light emitting device such as a light emitting diode (not shown) to the optical sensor 236a is passed or insulated in accordance with the rotated position of the AC plug 221, the optical sensor 236a can be turned on or off.

In the first operation state in which the AC plug 221 is raised (FIG. 30A), the optical sensor 336a is turned on. In the first operation state, the contact portion of the AC plug 221 contacts a spring contact 336b. When the AC plug 221 contacts the spring contact 336b, an AC power is supplied. In the second operation state in which the AC plug 221 is laid down (FIG. 30B), the optical sensor 36a is turned off. In accordance with a control signal generated in the first operation state in which the optical sensor 336a is turned on as shown in FIG. 30A, the terminals a and b of the switch S211 and the terminal d and e of the switch S212 are connected. An AC voltage is supplied to an AC-DC converter 222 through the AC plug 221, the spring contact 236b, and the switches S211 and S212. In accordance with a control signal generated in the second operation state in which the optical sensor 236b is turned off as shown in FIG. 30B, the terminals a and c of the switch S211 and the terminals d and f of the switch S212 are connected. A battery voltage or an output voltage of a DC-DC converter 223 is supplied to an electronic device through the AC plug 221 and the switches S211 and S212.

Figure 31A:
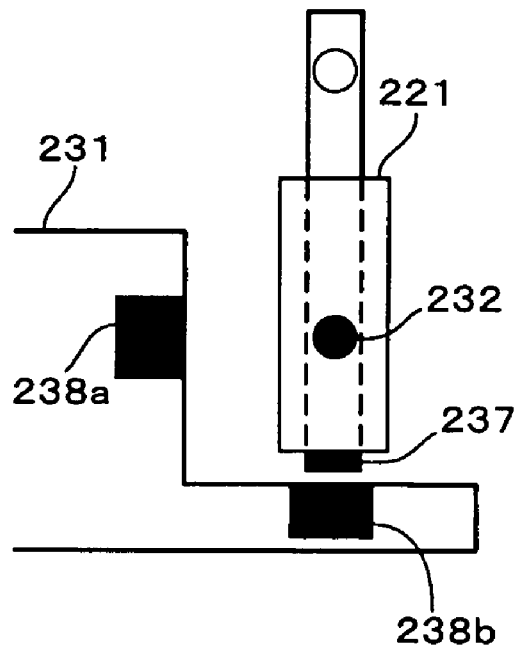
FIG. 31A and FIG. 31B are schematic diagrams showing the structure of a second example of switches whose switch positions are changed in accordance with the state of an AC plug.
Figure 31B:
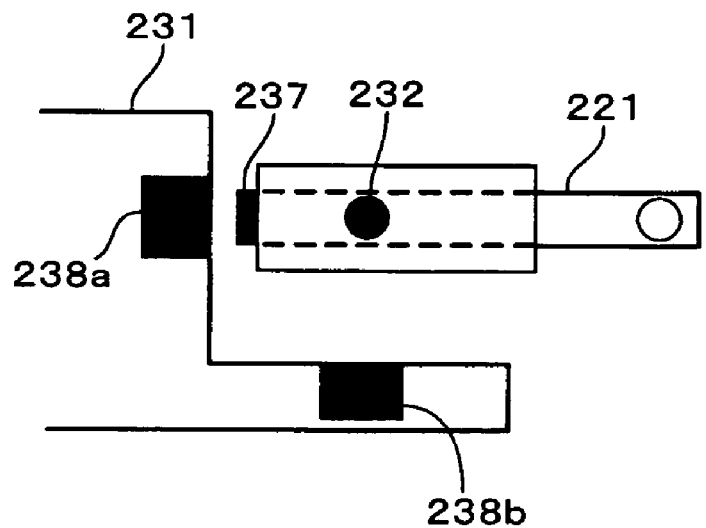

In an example shown in FIG. 31A and FIG. 31B, a magnet 237 is disposed at an edge portion of an AC plug 221 that is rotated about a shaft 232 selects one of magnet switches 238a and 238b. The magnet switches 238a and 238b correspond to the switches S201 and S202 according to the tenth and eleventh embodiments.

The magnet 237 and the magnet switches 238a and 238b may compose the detector 225 described with reference to FIG. 23 and FIG. 24. Switch control signals may be generated in accordance with outputs of the magnet switches 238a and 238b. In accordance with the control signals, the switches S211 and S212 may be controlled.

In a first operation state (FIG. 31A) of which the AC plug 221 is raised, since the magnet 237 is apart from the magnet switch 238a, the magnet switch 238a is turned off and the magnet switch 238b is turned on. In the second operation state (FIG. 31B) of which the AC plug 221 is laid down, since the magnet 237 is close to the magnet switch 38a, the magnet switch 238a is turned on and the magnet switch 238b is turned off.

In the first operation state of which the AC plug 21 is raised as shown in FIG. 31A, since the magnet 237 is apart from the magnet switch 238a, the terminals a and b of the switch S201 corresponding to the magnet switch 238a are connected. In the first operation state, since the magnet 237 is close to the magnet switch 238b, the terminals d and e of the switch S202 corresponding to the magnet switch 238b are connected. An AC voltage is supplied to an AC-DC converter 222 through the AC plug 221 and the switches S201 and S202. In contrast, in the second operation state of which the AC plug 221 is laid down as shown in FIG. 31B, since the magnet 237 is close to the magnet switch 238a, the terminals a and c of the switch S201 corresponding to the magnet switch 238a are connected. In the second operation state, since the magnet 237 is apart from the magnet switch 238b, the terminals d and f of the switch S202 are connected. A battery voltage or an output voltage of a DC-DC converter 223 is supplied to an electronic device through the AC plug 221 and the switches S201 and S202.

Figure 32:
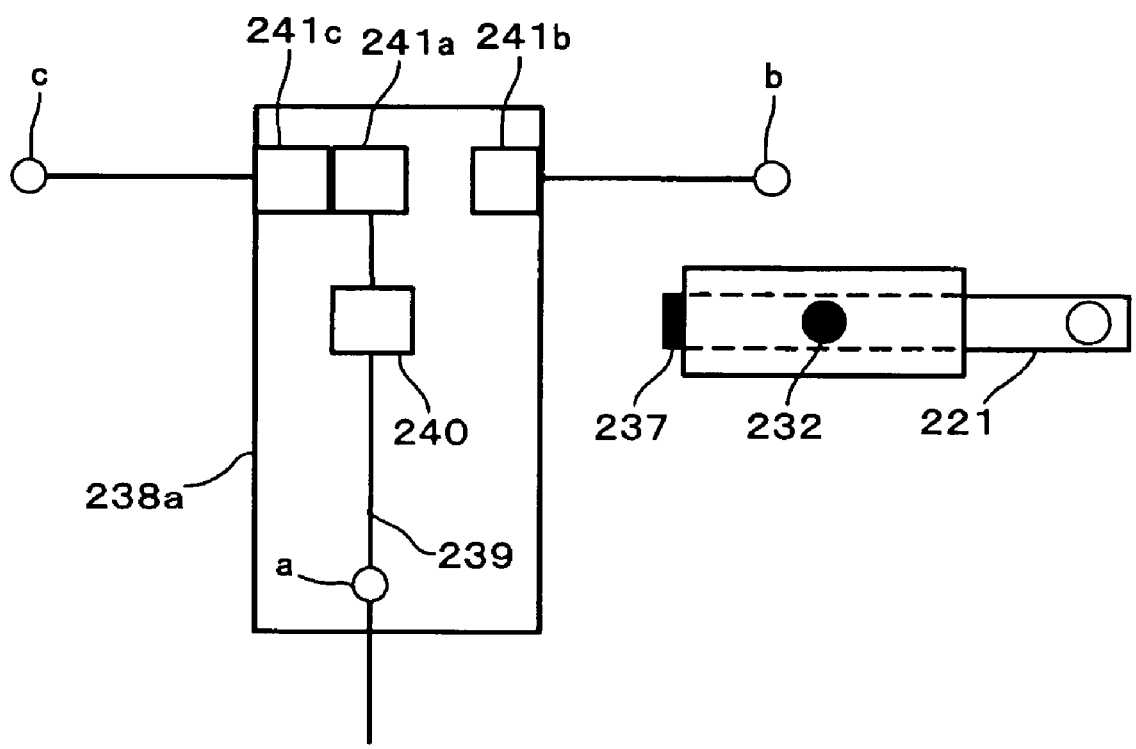
FIG. 32 is a schematic diagram showing an example of a magnet switch.

FIG. 32 shows an example of a magnet switch 238a. A magnet 240 and a movable contact 241a are mounted on a spring contact 239. When a magnet 237 of an AC plug 221 is close to the magnet 240 in a second operation state, the magnet 237 repels the magnet 240. As shown in FIG. 32, the movable contact 241a is in contact with a fixed contact 241c against the spring force of the spring contact 240. The magnet switch 238a corresponds to the switch S201. The spring contact 239 corresponds to the terminal a of the switch S201. The fixed contact 241a corresponds to the terminal c of the switch S201. Thus, this state represents that the terminals a and c of the switch S201 are connected.

When the AC plug 221 is rotated and placed in the first operation state, the magnetic repulsion force disappears. The resilience of the spring contact 239 causes the movable contact 241a to contact the fixed contact 241b. This state represents that the terminals a and b of the switch S201 are connected.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, the number of voltage converters contained in the battery pack is not limited to one. Instead, the number of voltage converters may be two or more. Alternatively, one voltage converter that generate a plurality of output voltages may be used. In addition, switching mechanisms may be various types such as a combination of switches and spring contacts. In addition, the present invention can be applied to a structure that does not have a protecting circuit.

What is claimed is:

1. A battery pack having a secondary battery, the battery pack comprising:

a voltage converter configured to provide a discharging voltage or a charging voltage based on an operational mode of the battery pack;

a switching unit which switches the operation mode of the voltage converter between a charging mode in which the voltage converter is electrically coupled between the secondary battery and a power input terminal and a discharging mode in which the voltage converter is operatively electrically coupled between the secondary battery and a power output terminal;

a power controlling unit configured to turn the voltage converter on or off;

a voltage converter sensing unit configured to send a signal indicative of a temperature of the voltage converter to the power controlling unit;

a secondary battery sensing unit coupled to the secondary battery and configured to send a signal indicative of the temperature of the secondary battery to the power controlling unit;

a case housing the secondary battery, voltage converter, and the switching unit;

and a plug having blades for reception into a power receptacle, the plug rotatably coupled to the case and having a first state when rotated to a first position and effecting the switching unit to switch the operation mode of the voltage converter to the charging mode and a second stated when rotated to a second position and effecting the switching unit to switch the operation mode of the voltage converter to the discharging mode, wherein, the power controlling unit is configured to turn off the voltage converter when the temperature of the voltage converter or secondary battery exceeds a predetermined threshold, in the charging mode, a charging voltage is output to the secondary battery, and in the discharging mode, a voltage of the secondary battery is converted into a predetermined discharging voltage and the converted voltage is output.

2. The battery pack as set forth in claim 1, further comprising a detecting unit which detects a state of which a charger has been connected, wherein the switching unit is configured to switch the operation mode of the voltage converter to the charging mode when the detected result of the detecting unit represents that the charger has been connected.

3. The battery pack as set forth in claim 2, wherein the detecting unit is configured to detect an identification resistance of the charger.

4. The battery pack as set forth in claim 2, wherein the detecting unit is configured to perform digital communication with the charger.

5. The battery pack as set forth in claim 2, wherein the detecting unit is configured to detect a state of which the charger has been connected.

6. The battery pack as set forth in claim 1, wherein the switching unit is configured to switch an output voltage of the voltage converter to one of a voltage of the charging mode and a voltage of the discharging mode.

7. The battery pack as set forth in claim 1, wherein the switching unit has a first switching unit which switches an input voltage of the voltage converter; and a second switching unit for switching an output voltage of the voltage converter.

8. The battery pack as set forth in claim 1, further comprising a protecting circuit for protecting the secondary battery.

9. The battery pack as set forth in claim 1, wherein along with the secondary battery, the voltage converter is housed in a case.

10. The battery pack as set forth in claim 1, wherein the voltage converter is a bi-directional type.

11. A battery pack having a secondary battery, the battery pack comprising:
   a voltage converter configured to provide a discharging voltage or a charging voltage based on an operational mode of the battery pack;
   a plurality of output terminals for at least two different voltages;
   a power controlling unit which determines whether the secondary battery is operating normally and turning on and off power of the voltage converter in accordance with the determined result;
   a voltage converter sensing unit configured to send a signal indicative of a temperature of the voltage converter to the power controlling unit;
   a secondary battery sensing unit configured to send a signal indicative of the temperature of the secondary battery to the power controlling unit;
   a case housing the secondary battery, voltage converter, and power controlling unit; and
   a plug having blades for reception into a power receptacle, the plug rotatably coupled to the case and having a first state when rotated to a first position and effecting the power controlling unit to turn on power of the voltage converter and a second stated when rotated to a second position and effecting the power controlling unit to turn off power of the voltage converter.

12. The battery pack as set forth in claim 11, wherein along with the secondary battery, the voltage converter is housed in a case.

13. The battery pack as set forth in claim 11, further comprising a protecting circuit for protecting the secondary battery.

14. The battery pack as set forth in claim 11, wherein the power controlling unit is configured to determine that the secondary battery is normally operating when the voltage of the secondary battery is a preset voltage or higher.

15. The battery pack as set forth in claim 11, wherein the power controlling unit is configured to determine that the secondary battery is normally operating when the voltage of the secondary battery is a preset voltage or lower.

16. The battery pack as set forth in claim 11, wherein the power controlling unit is configured to determine that the secondary battery is normally operating when the temperature of the secondary battery or the temperature in the vicinity thereof is a preset temperature or lower.

17. A battery pack having a secondary battery, the battery pack comprising:
   a voltage converter configured to provide a discharging voltage or a charging voltage based on an operational mode of the battery pack;
   a plurality of output terminals for at least two different voltages;
   an input terminal for a start signal that represents whether or not an output of the voltage converter is required;
   a power controlling unit which turns on/off the power of the voltage converter in accordance with the start signal;
   a voltage converter sensing unit configured to send a signal indicative of a temperature of the voltage converter to the power controlling unit;
   a secondary battery sensing unit configured to send a signal indicative of the temperature of the secondary battery to the power controlling unit;
   a case housing the secondary battery, voltage converter, and power controlling unit;
   and
   a plug having blades for reception into a power receptacle, the plug rotatably coupled to the case and having a first state when rotated to a first position and coupling power from the power receptacle to the input terminal and a second stated when rotated to a second position and decoupling power from the power receptacle to the input terminal.

18. The battery pack as set forth in claim 17, wherein along with the secondary battery, the voltage converter is housed in a case.

19. The battery pack as set forth in claim 17, further comprising a protecting circuit for protecting the secondary battery.

20. The battery pack as set forth in claim 17, wherein the start signal is supplied from an electronic device and that is varied depending on whether the power of the electronic device has been turned on/off, and wherein the power controlling unit is configured to turn on the power of the voltage converter when the power of the electronic device has been turned on.

* * * * *